(12) United States Patent
Royak et al.

(10) Patent No.: US 7,355,865 B2
(45) Date of Patent: Apr. 8, 2008

(54) METHOD AND APPARATUS FOR REJECTING THE SECOND HARMONIC CURRENT IN AN ACTIVE CONVERTER WITH AN UNBALANCED AC LINE VOLTAGE SOURCE

(75) Inventors: Semyon Royak, Beachwood, OH (US); Robert John Breitzmann, South Russel, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 243 days.

(21) Appl. No.: 10/918,629

(22) Filed: Aug. 13, 2004

(65) Prior Publication Data

US 2006/0034104 A1   Feb. 16, 2006

(51) Int. Cl.
 *H02M 1/12*    (2006.01)
(52) U.S. Cl. .................... 363/44; 363/46; 363/52; 363/87
(58) Field of Classification Search .......... 363/7, 363/39, 40, 44, 45, 46, 52–54, 87, 92, 125–130
See application file for complete search history.

(56) References Cited

U.S. PATENT DOCUMENTS 4,346,307 A * 8/1982 Zulaski ................. 307/130
6,535,404 B2 * 3/2003 Ainsworth et al. ......... 363/44

OTHER PUBLICATIONS

Kim, H.S. et al., Design of Current Controller for 3-Phase PWM Converter with Unbalanced Input Voltage, IEEE Aug. 1998, pp. 503-509.
Sakui, M. et al., Calculation of harmonic currents in a three-phase convertor with unbalanced power supply conditions, IEEE Proceedings-B, vol. 139, No. 5, Sep. 1992, pp. 478-484.
Stankovic, A.V. et al., A Generalized Control Method for Input-Output Harmonic Elimination for the PWM Boost Rectifier Under Simultaneous Unbalanced Input Voltages and Input Impendances, IEEE Aug. 2001, pp. 1309-1314.
Suh, Y. et al., A Nonlinear Control of the Instantaneous Power in dq Sunchronous Frame for PWM AC/DC Converter under Generalized Unbalanced Operating Conditions, IEEE Jul. 2002, pp. 1189-1196.
Tsai, W. et al., Effects of Voltage Unbalance and Harmonics on Three-Phase SPWM AC-to-DC Converters with Instantaneous Power Feedback, IEEE, Sep. 1993, pp. 61-66.

* cited by examiner

*Primary Examiner*—Jessica Han
(74) *Attorney, Agent, or Firm*—Quarles & Brady LLP; William R. Walbrun

(57) ABSTRACT

A method and apparatus for altering converter control as a function of the degree of unbalance in supply line voltages to substantially eliminate second harmonics on the supply lines caused by active control of the converter including identifying supply line peak amplitude values and using the peak values to identify potential second harmonics and then altering command values as a function of the potential second harmonic components.

36 Claims, 9 Drawing Sheets

METHOD AND APPARATUS FOR REJECTING THE SECOND HARMONIC CURRENT IN AN ACTIVE CONVERTER WITH AN UNBALANCED AC LINE VOLTAGE SOURCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Power consuming clients that link to a utility power grid and draw power therefrom have to limit the amount of disturbance they cause at the grid coupling point so that other customers linked to the grid can rely on a power at the coupling point that has at least certain characteristics (e.g., a limited amount of harmonics, a limited amount of unbalance, etc.). To this end a series of regulations (e.g., IEEE 519) have been adopted that specify grid linkage/power usage requirements.

AC power delivered to coupling points via grid lines (i.e., supply lines) is usually not in a condition that can be used by end users and therefore the power at the coupling point must be converted so as to have characteristics required by the end users. For instance, grid AC power is often converted from AC to DC via a rectifier and then back to AC by an inverter where the amplitude and frequency is altered by the AC-DC-AC conversion and the resulting power is in a form useable to power end user equipment (e.g., motors, computers, office equipment, etc.).

To convert supply line AC power to DC power, the power conversion industry has developed various converter topologies and methods. For instance, one common converter topology includes a six-pulse full wave converter. Six pulse converters are advantageous because they are relatively simple and inexpensive to construct. Unfortunately, six-pulse converters have been known to generate high levels of harmonics (e.g., fifth, seventh, third, eleventh, thirteenth, etc.) on linked supply lines which render these converters unusable under certain circumstances or useable only if other conditioning hardware is used therewith. Here, the other conditioning hardware adds expense to the overall system.

Other converter types that overcome some of the shortcomings of the 6 pulse type include a 12 pulse converter and an 18 pulse converter. As well known in the power conversion industry, 12 and 18 pulse converters are able to reduce harmonic distortion when controlled in certain ways and when used to convert balanced supply line voltages. Unfortunately, when supply line voltages are unbalanced, it has been observed that 12 and 18 pulse conversion can result in significant harmonic distortion.

Still one other converter type is generally referred to as an active converter where converter switching devices are actively controlled to facilitate four quadrant operation (i.e., where the converter can be used in a bi-directional manner—as a converter from the grid to the DC bus or as an inverter from the bus to the grid). In addition to other advantages, active converters can reduce supply line harmonics when linked with balanced supply lines such that IEEE 519 standards are met. Unfortunately, it has been observed that when supply line voltages are unbalanced, active conversion can generate second harmonics that exceed tolerable levels.

In addition, when the supply line voltages are unbalanced, active conversion often results in unbalanced current draw. Converter components are usually rated for use with specific maximum or steady state currents and therefore, where currents drawn are unbalanced, the phase of the conversion hardware carrying the highest current must be used to limit conversion rate. In other words, once the current through one phase reaches the rated current level, the converter capacity must be limited to protect that phase despite the fact that the other two phases may have current levels far below the rated level.

Moreover, it has been observed that under certain circumstances unbalanced supply line voltage causes increased voltage ripple on the DC bus (i.e., the link between the converter and the inverter in an AC-DC-AC conversion topology) which can cause increased heating and can shorten the useful life of conversion hardware components as well s the useful life of inverter components linked to the DC bus.

Thus, it would be advantageous to have an AC-DC conversion configuration that could simply and inexpensively maintain supply line harmonics including the second harmonic to below tolerable threshold levels and that could minimize DC bus voltage ripple even where supply line voltages are unbalanced.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that, given certain reasonable assumptions, equations can be formulated to identify the amplitudes of supply line voltages from RMS line-to-line voltages which can in turn be used to identify supply line voltages that would result from active conversion of the unbalanced voltages. Once the second harmonic components of the supply line voltages that would result from normal active conversion have been identified, the identified second harmonic components can be used to modify converter command or control signals so that the second harmonics that are actually generated are substantially minimized. When the second harmonics in the supply line voltages are minimized, the converter currents are more balanced and a conversion rate (i.e., converter capacity) can be increased. In addition, when the supply line second harmonics are minimized, DC bus ripple is substantially reduced.

The compensation step can be performed in either a two phase synchronous dq frame of reference or in a three phase stationary frame of reference. The calculations in the two phase reference frame are more complex than in the three phase reference frame and therefore, all other things being equal, it may be advantageous to perform the process in a three phase reference frame. However, many existing controllers are programmed to operate in the two phase reference frame and therefore, in many cases, two phase compensation may be advantageous.

Consistent with the above comments, the present invention includes a method for use with a controller and a converter where the controller actively controls the converter to convert three phase voltages on three supply lines to a DC voltage across positive and negative DC buses, the method comprising the steps of identifying the peak amplitudes of the three phase supply line voltages, using the peak amplitudes to identify a second harmonic component that would be generated on the supply lines by the converter during normal operation due to unbalance in the peak amplitudes and altering control of the converter as a function of the identified second harmonic.

In at least some embodiments the controller generates command voltages to control the converter, the step of altering control of the converter including modifying the command voltages as a function of the identified second harmonic. Here, the step of identifying the peak amplitudes may include sensing the RMS line-to-line voltages and using the RMS line-to-line voltages to identify the peak amplitudes.

In some cases the controller receives a DC reference voltage and controls the converter to cause the DC voltage across the DC buses to track the reference voltage, the method further including the step of using the reference voltage to identify d and q-axis voltage difference values, the step of identifying the second harmonic components including the step of identifying d and q-axis components of the second harmonic, the step of modifying the command voltages including mathematically combining the difference values and the second harmonic components to identify two phase d and q-axis command voltages.

The step of mathematically combining may include adding the d and q-axis second harmonic components to the d and q-axis difference values.

The method may further include the step of using the peak amplitudes to identify a DC offset and wherein the step of modifying the command voltages further includes adding the DC offset to the q-axis difference value along with the q-axis second harmonic component.

In some embodiments the peak amplitudes of the three supply line voltages are a, b and c and wherein the step of identifying the d and q axis second harmonic components includes using the peak amplitudes to identify a two phase amplitude $A_{min}$.

In some cases the method may further include the steps of identifying the frequency of the second harmonic of the supply line voltages and using the frequency to identify a two phase supply voltage angle, the step of identifying the second harmonic components including identifying the q-axis second harmonic component by multiplying value $A_{min}$ by the sine of the voltage angle and identifying the d-axis second harmonic component by multiplying value $A_{min}$ by the cosine of the voltage angle.

In at least some embodiments the step of using the reference voltage to identify d and q-axis voltage difference values includes using the reference voltage to identifying d and q-axis command currents, obtaining d and q-axis feedback currents, subtracting the d and q-axis feedback currents from the d and q-axis command currents, respectively, and using the d and q-axis command currents to identify the voltage difference values.

In some embodiments the controller receives a DC reference voltage and controls the converter to cause the DC voltage across the DC buses to track the reference voltage, the method further including the step of using the reference voltage to identify first, second and third phase voltage difference values, the step of identifying the second harmonic components including the step of identifying first, second and third phase components of the second harmonic corresponding to the first, second and third supply lines, respectively, the step of modifying the command voltages including mathematically combining the difference values and the second harmonic components to identify first, second and third command voltages.

The step of mathematically combining may include adding the first, second and third phase second harmonic components to the first, second and third phase difference values. The method of claim 11 further including the step of identifying the frequency of the supply line voltages and using the frequency to identify a supply voltage angle, the step of identifying the second harmonic components including identifying the q-axis second harmonic component by multiplying peak values a, b and c by the sine of the supply voltage angle, the sine of the supply voltage angle less 120 degrees and the sine of the supply voltage angle plus 120 degrees, respectively.

The step of using the reference voltage to identify voltage difference values may include using the reference voltage to identifying first, second and third phase reference currents, obtaining first, second and third phase feedback currents, subtracting the first, second and third phase feedback currents from the first, second and third reference currents to identify first, second and third command currents, respectively, and using the first, second and third phase command currents to identify the voltage difference values.

The invention also includes a processor of controller programmed to perform the various processes and methods described above and hereafter.

The invention also contemplates a method for use with a controller and a converter wherein the controller receives a reference voltage and generates first, second and third phase control voltages as a function of the reference voltage, the converter receiving the first, second and third phase control voltages and first, second and third phase line voltages and converting the line voltages to a DC voltage across positive and negative DC buses as a function of the control voltages where the line voltages may be unbalanced, the method for substantially reducing the second harmonics in the first, second and third phase line currents caused by drawing current from the lines when the line voltages are unbalanced, the method comprising the steps of identifying first, second and third RMS line-to-line voltages, using the RMS line-to-line voltages to identify peak phase voltage values, mathematically combining the peak phase voltage values and at least a derivative of the reference voltage to generate the first, second and third phase command voltages; and using the first, second and third phase command voltages to control the converter.

At least some embodiments of the invention include a method for use with a controller and a converter where the controller actively controls the converter to convert three phase voltages on three supply lines to a DC voltage across positive and negative DC buses, the method comprising the steps of identifying unbalance in the peak amplitudes of the three phase supply line voltages and using the unbalance to alter control of the converter to substantially eliminate generation of second harmonics on the supply lines due to active converter control.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Hereinafter, subscript "a", "b", and "c" will be used to refer to supply line voltage and current values in a three phase stationary frame of reference, subscript, "u", "v" and "w" will be used to refer to controller voltage and current values in a three phase stationary frame of reference. In addition, a subscript "f" is used to refer to a feedback current or voltage value, a subscript "ff" is used to refer to a feedforward value, a subscript "ref" is used to refer to a reference value, a superscript "*" is used to refer to a command value, a subscript "RMS" is used to refer to an RMS value, a subscript "L" is used to refer to a load value, a subscript "DC" is used to refer to a DC value, subscript "d" and "q" are used to refer to d and q-axis values in a two phase synchronous reference frame, respectively, subscript "α" and "β" are used to refer to α and β-axis values in a two phase stationary reference frame and a subscript "o" is used to refer to an offset value.

Hereinafter, first some theory that forms the basis for the present inventive concepts is provided, second, some practical controller configurations are described that may be used to facilitate the inventive concepts and finally some graphs are described that illustrate the effects of the invention.

Figure 1:
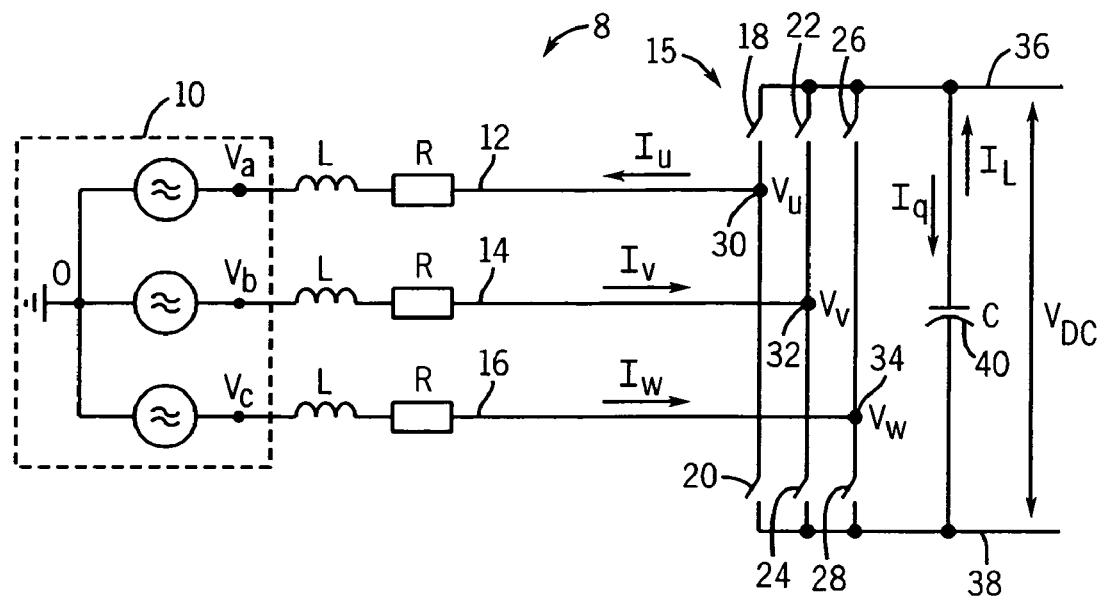
FIG. 1 is a schematic diagram of a prior art active converter electrical circuit.

Referring now to FIG. 1, a simplified active converter configuration 8 is illustrated and includes a three phase AC power source 10 that provides three phase voltages $V_a$, $V_b$ and $V_c$ on three power lines 12, 14 and 16 to a converter 15 including six power switching devices (e.g., semiconductor switching devices) 18, 12, 22, 24, 26 and 28 which converts the three phase AC voltages to DC voltage $V_{DC}$ across positive and negative DC buses 36 and 38, respectively. Each line 12, 14 and 16 is characterized by a line inductance L and a line resistance R.

Converter switches 18, 20, 22, 24, 26 and 28 are linked between the positive and negative DC buses 36 and 38, respectively. A DC bus capacitor 40 is also linked between DC buses 36 and 38. As well known in the conversion arts, converter switches 18, 20, 22, 24, 26 and 28 are controlled by a controller (not illustrated in FIG. 1) in a fashion to generally convert the AC power on lines 12, 14 and 16 to DC across buses 36 and 38. When switches 22-28 are controlled to generate DC voltage $V_{DC}$, three phase voltages $V_u$, $V_v$ and $V_w$ result at nodes 30, 32 and 34, respectively. The potential differences across lines 12, 14 and 16 (i.e., across inductive values L and resistive values R) cause currents $I_u$, $I_v$ and $I_w$ to pass threrethrough. Currents $I_u$, $I_v$ and $I_w$ cause two phase q-axis current $I_q$ which charges capacitor 40. Although not illustrated in FIG. 1, a load (e.g., an inverter and motor/generator may be linked to buses 36 and 38 to receive power therefrom where the load draws current $I_L$.

The voltages $V_a$, $V_b$ and $V_c$ in FIG. 1 can be represented by the following equations:

$$V_a = a \cdot \mathrm{Sin}(\omega t) \qquad \text{Eq. 1}$$

$$V_b = b \cdot \mathrm{Sin}(\omega t - 120°) \qquad \text{Eq. 2}$$

$$V_c = c \cdot \mathrm{Sin}(\omega t + 120°) \qquad \text{Eq. 3}$$

where a, b and c are phase voltage peak values. If voltage source 10 is balanced then $a = b = c = e_0$ where $e_0$ is the phase voltage peak for a balanced AC line voltage source. Combining the above equations and using expressions consistent with the labels in FIG. 1, the following expressions can be formulated:

$$V_u - V_a = I_u R \cdot (1 + Tp) \text{ or } I_u = (V_u - V_a) \cdot \frac{1}{R} \cdot \frac{1}{1 + Tp} \qquad \text{Eq. 4}$$

$$V_v - V_b = I_v R \cdot (1 + Tp) \text{ or } I_v = (V_v - V_b) \cdot \frac{1}{R} \cdot \frac{1}{1 + Tp} \qquad \text{Eq. 5}$$

$$V_w - V_c = I_u R \cdot (1 + Tp) \text{ or } I_w = (V_w - V_c) \cdot \frac{1}{R} \cdot \frac{1}{1 + Tp} \qquad \text{Eq. 6}$$

$$V_{DC} = \frac{1}{C} \cdot \int (I_q - I_L) \cdot dt \text{ or } V_{DC} = (I_q - I_L) \cdot \frac{1}{pC} \qquad \text{Eq. 7}$$

where p is a differential operator (i.e., p=d/dt), T and is a time constant associated with values L and R (i.e., T=L/R), $I_q$ is the two phase synchronous q-axis component output of an active converter current and $I_L$ is the load current. While the circuit of FIG. 1 illustrates a three phase system, many controllers operate in the synchronous two phase dq reference frame. For this reason, according to at least some inventive embodiments, signals and values are converted to the two phase dq reference frame. To this end, conversion can be performed via a two step process. First, the three phase stationary values can be converted to two phase stationary values in an αβ reference frame and then the two phase stationary values can be converted to the two phase synchronous values in the dq reference frame.

Equations 4, 5 and 6 can be converted from the three phase stationary reference frame to the two phase synchronous dq reference frame using the following equations:

$$\alpha = a \qquad \text{Eq. 8}$$

$$\beta = \frac{1}{\sqrt{3}} a + \frac{2}{\sqrt{3}} c \qquad \text{Eq. 9}$$

$$d = \alpha \ A \ \text{Cos}(\omega t) - \beta \ A \ \text{Sin}(\omega t) \qquad \text{Eq. 10}$$

$$q = \alpha \ A \ \text{Sin}(\omega t) + \beta \ A \ \text{Cos}(\omega t) \qquad \text{Eq. 11}$$

Combining Equations 1-6, 8 and 9 and manipulating the results yields the following equations in the two phase αβ reference frame:

$$V_\alpha = I_\alpha R \ A \ (1+Tp) + e_0 \ A \ \text{Sin} \ (\omega t) \qquad \text{Eq. 12}$$

$$V_\beta = I_\beta R \ A \ (1+Tp) + e_0 \ A \ \text{Cos} \ (\omega t) \qquad \text{Eq. 13}$$

Equations 10 through 13 can be combined to yield the following equations:

$$V_d = I_d R \cdot (1 + Tp) \text{ or } I_d = V_d \cdot \frac{1}{R} \cdot \frac{1}{1 + Tp} \qquad \text{Eq. 14}$$

$$V_q = I_q R \cdot (1 + Tp) + e_0 \text{ or } I_q = (V_q - e_0) \cdot \frac{1}{R} \cdot \frac{1}{1 + Tp} \qquad \text{Eq. 15}$$

Consistent with Equations 14 and 15 above, controllers that operate in the dq reference frame typically include a d-component feedback current loop, a q-component feedback current loop and a feed forward loop within the q-current loop that adds the peak of phase voltage $e_0$ within the loop. If voltage source 10 is balanced, all three currents $I_u$, $I_v$ and $I_w$ are identical and the DC bus voltage has nominal ripple.

If the AC line voltage source has unbalanced voltages, currents $I_u$, $I_v$ and $I_w$ will not be identical and therefore the converter cannot be used at full capacity. If the line voltages are unbalanced, then peak values a, b, c and $e_0$ are not equal. To determine how to compensate for the unbalanced line voltages, the magnitude of the unbalance must be identified.

Figure 2:
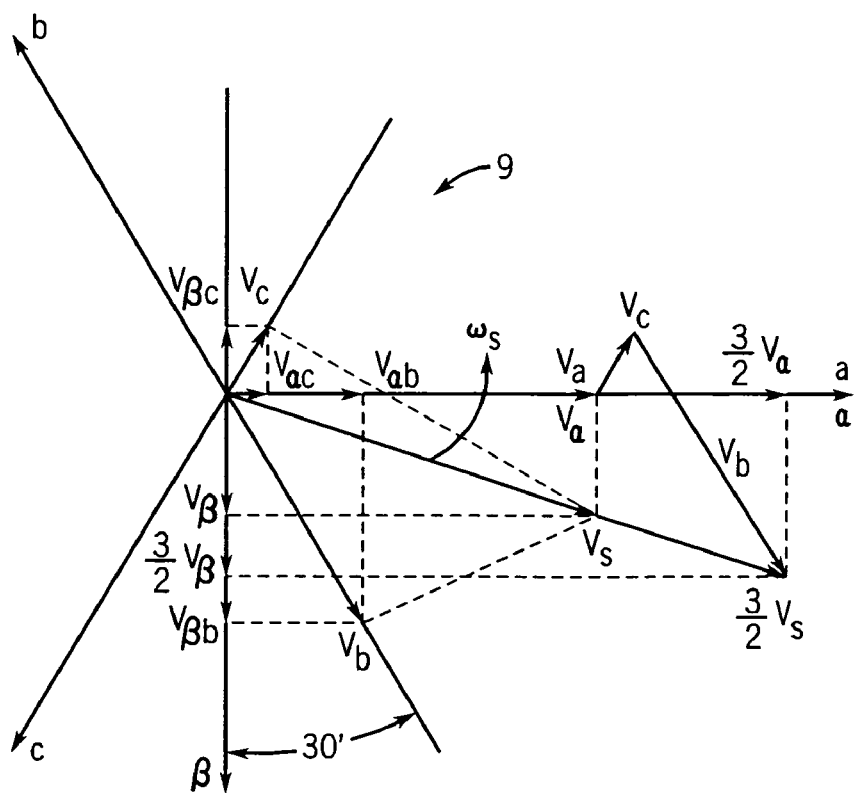
FIG. 2 is a phasor diagram illustrating the relationships between phasors in a stationary three phase system and phasors in a stationary two phase system.

Referring to FIG. 2, a phase diagram 9 is illustrated that includes a three phase stationary reference frame including axis a, b and c and a two phase stationary reference frame including axis α and β. The following equations can be written that are consistent with the relationships between the phasors illustrated in FIG. 2:

$$V_\alpha = \frac{2}{3}(V_a + V_{\alpha b} + V_{\alpha c}) \qquad \text{Eq. 16}$$

$$V_\beta = \frac{2}{3}(V_{\beta b} - V_{\beta c}) \qquad \text{Eq. 17}$$

$$V_{\alpha b} = -V_c \text{Cos} 60° = -\frac{1}{2} V_b \qquad \text{Eq. 18}$$

$$V_{\alpha c} = -V_c \text{Cos} 60° = -\frac{1}{2} V_c \qquad \text{Eq. 19}$$

$$V_{\beta b} = -V_b \text{Cos} 30° = -\frac{\sqrt{3}}{2} V_b \qquad \text{Eq. 20}$$

$$V_{\beta c} = -V_c \text{Cos} 30° = -\frac{\sqrt{3}}{2} V_c \qquad \text{Eq. 21}$$

where

Combining Equations 16, 18 and 19 we can write the following equation:

$$V_a = e_0^* \cdot \left[ \frac{2}{3} \cdot a^* \cdot \text{Sin}(\omega t) - \frac{1}{3} \cdot b^* \cdot \text{Sin}(\omega t - 120°) - \frac{1}{3} \cdot c^* \cdot \text{Sin}(\omega t + 120°) \right] \qquad \text{Eq. 22}$$

where:

$$e_0^* = \frac{a + b + c}{3}$$

and is the average peak of phase voltage and Eq. 23

$$a^* = \frac{a}{e_0^*}; \ b^* = \frac{b}{e_0^*}; \ c^* = \frac{c}{e_0^*}$$

where a*, b* and c* are the per unit peaks of phase voltages. Equation 22 can be rewritten and manipulated to yield:

$$V_\alpha = e_0^* \cdot \left[ \frac{1}{6} \cdot (4a^* + b^* + c^*) \cdot \text{Sin}(\omega t) + \frac{1}{2\sqrt{3}} \cdot (b^* - c^*) \cdot \text{Cos}(\omega t) \right] \qquad \text{Eq. 24}$$

If a*=b*=c*=1 for a balanced system then $V_\alpha = e_0 \ A \ \text{Sin}(\omega t)$. If a*≠b*≠c* for an unbalanced system then Equation 24 can be expressed as:

$$V_\alpha = A_\alpha A \mathrm{Sin}(\omega t + \varphi_\alpha) \quad \text{Eq. 25}$$

where:

$$A_\alpha = e_0^* \cdot \sqrt{\left[\frac{1}{6}\cdot(4a^* + b^* + c^*)\right]^2 + \left[\frac{b^* - c^*}{2\sqrt{3}}\right]^2}$$

$$= \frac{e_0^*}{3} \cdot \sqrt{(a^* + b^*)^2 + (a^* + c^*)^2 + 2(a^*)^2 - b^* \cdot c^*} \quad \text{Eq. 26}$$

and:

$$\varphi_\alpha = \mathrm{arctg}\left[\frac{6\cdot(b^* - c^*)}{2\sqrt{3}\cdot(4a^* + b^* + c^*)}\right] = \mathrm{arctg}\left[\frac{\sqrt{3}\cdot(b^* - c^*)}{4a^* + b^* + c^*}\right] \quad \text{Eq. 27}$$

In a similar fashion, Equations 17, 20 and 21 can be combined to yield the following expression:

$$V_\beta = e_0^* \cdot \begin{bmatrix} \frac{1}{\sqrt{3}}\cdot c^*\mathrm{Sin}(\omega t)\mathrm{Cos}120° + \frac{1}{\sqrt{3}}\cdot c^*\mathrm{Cos}(\omega t)\mathrm{Sin}120° - \\ \frac{1}{\sqrt{3}}\cdot b^*\mathrm{Sin}(\omega t)\mathrm{Cos}120° + \frac{1}{\sqrt{3}}\cdot b^*\mathrm{Cos}(\omega t)\mathrm{Sin}120° \end{bmatrix} \quad \text{Eq. 28}$$

which can be manipulated to yield:

$$V_\beta = e_0^* \cdot \left[\frac{(b^* - c^*)}{2\sqrt{3}}\cdot \mathrm{Sin}(\omega t) + \frac{1}{2}\cdot(b^* + c^*)\cdot \mathrm{Cos}(\omega t)\right] \quad \text{Eq. 29}$$

If $a^* = b^* = c^* = 1$ for a balanced system, then $V_\beta = e_0$ A Cos ($\omega$t). If $a^* \neq b^* \neq c^*$ for an unbalanced system then Equation 29 can be expressed as:

$$V_\beta = A_\beta A \, \mathrm{Sin}(\omega t + \phi_\beta) \quad \text{Eq. 30}$$

where:

$$A_\beta = e_0^* \cdot \sqrt{\left[\frac{b^* - c^*}{2\sqrt{3}}\right]^2 + \left[\frac{b^* + c^*}{4}\right]^2}$$

$$= \frac{e_0^*}{\sqrt{3}} \cdot \sqrt{(b^* + c^*)^2 - b^* \cdot c^*} \quad \text{Eq. 31}$$

and $$\varphi_\beta = \mathrm{arctg}\left[\frac{\sqrt{3}\cdot(b^* + c^*)}{b^* - c^*}\right] \quad \text{Eq. 32}$$

Phase equations similar to Equations 12 and 13 for a system including a balanced source can be written for a system linked to an unbalanced source as:

$$V_\alpha = I_\alpha R \cdot (1 + Tp) + A_\alpha \cdot \mathrm{Sin}(\omega t + \phi_\alpha) \quad \text{Eq. 33}$$

$$V_\beta = I_\beta R \cdot (1 + Tp) + A_\beta \cdot \mathrm{Sin}(\omega t + \phi_\beta) \quad \text{Eq. 34}$$

Equations 33 and 34 can be converted to the two phase synchronous dq frame of reference using the well known formulas:

$$V_d = V_\alpha \, \mathrm{Cos}(\omega t) - V_\beta \, \mathrm{Sin}(\omega t) \quad \text{Eq. 35}$$

$$V_q = V_\alpha \, \mathrm{Sin}(\omega t) + V_\beta \, \mathrm{Cos}(\omega t) \quad \text{Eq. 36}$$

Equations 33 through 36 can be combined to yield:

$$V_d = I_d R \cdot (1+Tp) + A_\alpha \cdot \mathrm{Sin}(\omega t + \phi_\alpha)\cdot \mathrm{Cos}(\omega t) - A_\beta \cdot \mathrm{Sin}(\omega t + \phi_\beta)\cdot \mathrm{Sin}(\omega t) \quad \text{Eq. 37}$$

$$V_q = I_q R \cdot (1+Tp) + A_\alpha \cdot \mathrm{Sin}(\omega t + \phi_\alpha)\cdot \mathrm{Sin}(\omega t) + A_\beta \cdot \mathrm{Sin}(\omega t + \phi_\beta)\cdot \mathrm{Cos}(\omega t) \quad \text{Eq. 38}$$

In almost all cases it can be assumed that the unbalance between the supply line phases will not be more than 25% as indicated by the following expression:

$$0.75 < a^* < 1.25; \; 0.75 < b^* < 1.25 \text{ and } 0.75 < c^* < 1.25 \quad \text{Eq. 39}$$

Here, if the assumption in Equation 39 is made, then:

$$A_\alpha \cdot \mathrm{Cos}(\varphi_\alpha) \approx A_\beta \cdot \mathrm{Sin}(\varphi_\beta) \quad \text{Eq. 40}$$

$$A_\alpha \cdot \mathrm{Sin}(\varphi_\alpha) \approx A_\beta \cdot \mathrm{Cos}(\varphi_\beta) \quad \text{Eq. 41}$$

$$A_\alpha \cdot \mathrm{Cos}(\varphi_\alpha) - A_\beta \cdot \mathrm{Sin}(\varphi_\beta) \approx 0 \quad \text{Eq. 42}$$

$$A_\alpha \cdot \mathrm{Cos}(\varphi_\alpha) \approx A_\beta \cdot \mathrm{Sin}(\varphi_\beta) = \quad \text{Eq. 43}$$

$$\frac{A_\alpha \cdot \mathrm{Cos}(\varphi_\alpha) + A_\beta \cdot \mathrm{Sin}(\varphi_\beta)}{2} = A_{\max} \approx e_0^*$$

$$A_\alpha \cdot \mathrm{Sin}(\varphi_\alpha) \approx A_\beta \cdot \mathrm{Cos}(\varphi_\beta) = \frac{A_\alpha \cdot \mathrm{Sin}(\varphi_\alpha) + A_\beta \cdot \mathrm{Cos}(\varphi_\beta)}{2} = A_{\min} \quad \text{Eq. 44}$$

$$A_\alpha \cdot \mathrm{Sin}(\varphi_\alpha) + A_\beta \cdot \mathrm{Cos}(\varphi_\beta) = 2 A_{\min} \quad \text{Eq. 45}$$

Combining Equations 37, 38 and 40-45 yields the following equations:

$$I_d = [V_d - A_{\min}\cdot \mathrm{Cos}(2\omega t)] \cdot \frac{1}{R\cdot(1+Tp)} \quad \text{Eq. 46}$$

$$I_q = \{V_q - [e_0^* + A_{\min}\cdot \mathrm{Sin}(2\omega t)]\} \cdot \frac{1}{R\cdot(1+Tp)} \quad \text{Eq. 47}$$

Equations 46 and 47 correspond to a d-q model or object corresponding to an active converter linked to an unbalanced AC line voltage source. Equations 46 and 47 show that both d and q active converter currents include a second harmonic component and therefore a control scheme that uses phase peak $e_0$ as a simple feed forward control is insufficient to eliminate the second harmonics in the supply line voltages that occur during active conversion of unbalanced voltages. Consistent with Equations 46 and 47, a more complicated feed forward compensation scheme for each of the d and q-axis loops is required.

Calculation of the feed forward signal values can be made based on equations 26, 27, 31, 32 and 44. These equations require knowledge about the phase peak voltage (i.e., a, b and c) for each individual phase of the unbalanced AC line voltage source. Typical control configurations include sensors that measure RMS line-to-line voltages as opposed to peak phase voltages. To facilitate compensation with existing conventional hardware, phase AC voltages must be derived from RMS line-to-line voltages (i.e., peak values a, b and c have to be expressed as a function of RMS line-to-line values $V_{ab\_RMS}$, $V_{bc\_RMS}$, $V_{ca\_RMS}$).

Combining Equations 1-3, line-to-line voltages $V_{ab}$, $V_{bc}$, and $V_{ca}$ can be expressed as:

$$V_{ab} = V_a - V_b \qquad \text{Eq. 48}$$
$$= a \cdot \text{Sin}(\omega t) - b \cdot \text{Sin}(\omega t - 120°)$$
$$= a \cdot \text{Sin}(\omega t) - [b \cdot \text{Sin}(\omega t) \cdot \text{Cos}(120°) - b \cdot \text{Cos}(\omega t) \cdot \text{Sin}(120°)]$$
$$= \left(a + \frac{b}{2}\right) \cdot \text{Sin}(\omega t) + \frac{\sqrt{3}}{2} \cdot b \cdot \text{Cos}(\omega t)$$
$$= \sqrt{a^2 + a \cdot b + b^2} \cdot \text{Sin}\left[\omega t + arctg\left(\frac{\sqrt{3} \cdot b}{2 \cdot a + b}\right)\right]$$

$$V_{bc} = V_b - V_c \qquad \text{Eq. 49}$$
$$= b \cdot \text{Sin}(\omega t - 120°) - c \cdot \text{Sin}(\omega t + 120°) =$$
$$= -\frac{1}{2} \cdot (b - c) \cdot \text{Sin}(\omega t) - \frac{\sqrt{3}}{2} \cdot (b + c) \cdot \text{Cos}(\omega t)$$
$$= \sqrt{b^2 + b \cdot c + c^2} \cdot \text{Sin}\left[\omega t + arctg\left(\frac{\sqrt{3} \cdot (b + c)}{b - c}\right)\right]$$

$$V_{ca} = V_c - V_a \qquad \text{Eq. 50}$$
$$= c \cdot \text{Sin}(\omega t + 120°) - a \cdot \text{Sin}(\omega t)$$
$$= c \cdot \text{Sin}(\omega t) \cdot \text{Cos}(120°) + c \cdot \text{Cos}(\omega t) \cdot \text{Sin}(120°) - a \cdot \text{Sin}(\omega t)$$
$$= -\left(a + \frac{c}{2}\right) \cdot \text{Sin}(\omega t) + \frac{\sqrt{3}}{2} \cdot c \cdot \text{Cos}(\omega t)$$
$$= \sqrt{a^2 + a \cdot c + c^2} \cdot \text{Sin}\left[\omega t + arctg\left(\frac{\sqrt{3} \cdot c}{2 \cdot a + c}\right)\right]$$

respectively. If the AC line voltage source is balanced then the peak values will be equal (i.e., a=b=c) and $V_{ab}=\sqrt{3} \cdot a \cdot \text{Sin}(\omega t+30°)$; $V_{bc}=\sqrt{3} \cdot a \cdot \text{Sin}(\omega t+90°)$ and $V_{ca}=-\sqrt{3} \cdot a \cdot \text{Sin}(\omega t-30°)$. The RMS line-to-line voltages $V_{ab\_RMS}$, $V_{bc\_RMS}$, $V_{ca\_RMS}$ for an unbalanced system can be expressed as:

$$V_{ab\_RMS} = \frac{\sqrt{a^2 + a \cdot b + b^2}}{\sqrt{2}} \qquad \text{Eq. 51}$$

$$V_{bc\_RMS} = \frac{\sqrt{b^2 + b \cdot c + c^2}}{\sqrt{2}} \qquad \text{Eq. 52}$$

$$V_{ca\_RMS} = \frac{\sqrt{a^2 + a \cdot c + c^2}}{\sqrt{2}} \qquad \text{Eq. 53}$$

respectively. Equations 51-53 can be rewritten as:

$$a^2 + a \cdot b + b^2 = 2 \cdot V^2_{ab\_RMS} \qquad \text{Eq. 54}$$

$$b^2 + b \cdot c + c^2 = 2 \cdot V^2_{bc\_RMS} \qquad \text{Eq. 55}$$

$$c^2 + c \cdot a + a^2 = 2 \cdot V^2_{ca\_RMS} \qquad \text{Eq. 56}$$

A general equation for the relationship between phase peak values a, b and c and line-to-line RMS voltages with either a balanced or an unbalanced voltage source can be expressed as:

$$a + b + c = \frac{\sqrt{2} \cdot (V_{ab\_RMS} + V_{bc\_RMS} + V_{ca\_RMS})}{\sqrt{3}} \qquad \text{Eq. 57}$$

Subtracting Equation 55 from Equation 56 and taking Equation 57 into account yields the following equation:

$$a - b = \frac{\sqrt{6} \cdot (V^2_{ca\_RMS} - V^2_{bc\_RMS})}{V_{ab\_RMS} + V_{bc\_RMS} + V_{ca\_RMS}} = X_1 \qquad \text{Eq. 58}$$

Similarly, Subtracting Equation 56 from Equation 54 and taking Equation 57 into account yields the following equation:

$$b - c = \frac{\sqrt{6} \cdot (V^2_{ab\_RMS} - V^2_{ca\_RMS})}{V_{ab\_RMS} + V_{bc\_RMS} + V_{ca\_RMS}} = X_2 \qquad \text{Eq. 59}$$

and, subtracting Equation 54 from Equation 55 and taking Equation 57 into account yields the following equation:

$$c - a = \frac{\sqrt{6} \cdot (V^2_{bc\_RMS} - V^2_{ab\_RMS})}{V_{ab\_RMS} + V_{bc\_RMS} + V_{ca\_RMS}} = X_3 \qquad \text{Eq. 60}$$

Equations 54 and 58 can be solved together. To this end, from Equation 58:

$$b = a - X_1 \qquad \text{Eq. 61}$$

Combining Equations 61 and 54 and rearranging the terms:

$$a = \frac{X_1}{2} + \sqrt{\frac{2}{3} \cdot V^2 ab\_RMS - \frac{X_1^2}{12}} \qquad \text{Eq. 62}$$

If we will take into account that $$\frac{X_1^2}{12} << \frac{2}{3} \cdot V^2 ab\_RMS,$$

then Equation 62 can be simplified as:

$$a \approx \frac{X_1}{2} + \sqrt{\frac{2}{3}} \cdot V_{ab\_RMS} \qquad \text{Eq. 63}$$

Equations 58 and 63 can be combined to identify the peak phase value a as:

$$a = \qquad \text{Eq. 64}$$
$$\sqrt{\frac{2}{3}} \cdot V_{ab\_RMS} + \sqrt{\frac{3}{2}} \cdot \frac{(V^2_{ca\_RMS} + V^2_{bc\_RMS})}{V_{ab\_RMS} + V_{bc\_RMS} + V_{ca\_RMS}}$$

The same substitutions and manipulations as above can be made for each of the other two phases to identify peak values b and c according to the following equations:

$$b = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}} \quad \text{Eq. 65}$$

$$c = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{cz\_RMS}} \quad \text{Eq. 66}$$

First Embodiment

Figure 3:
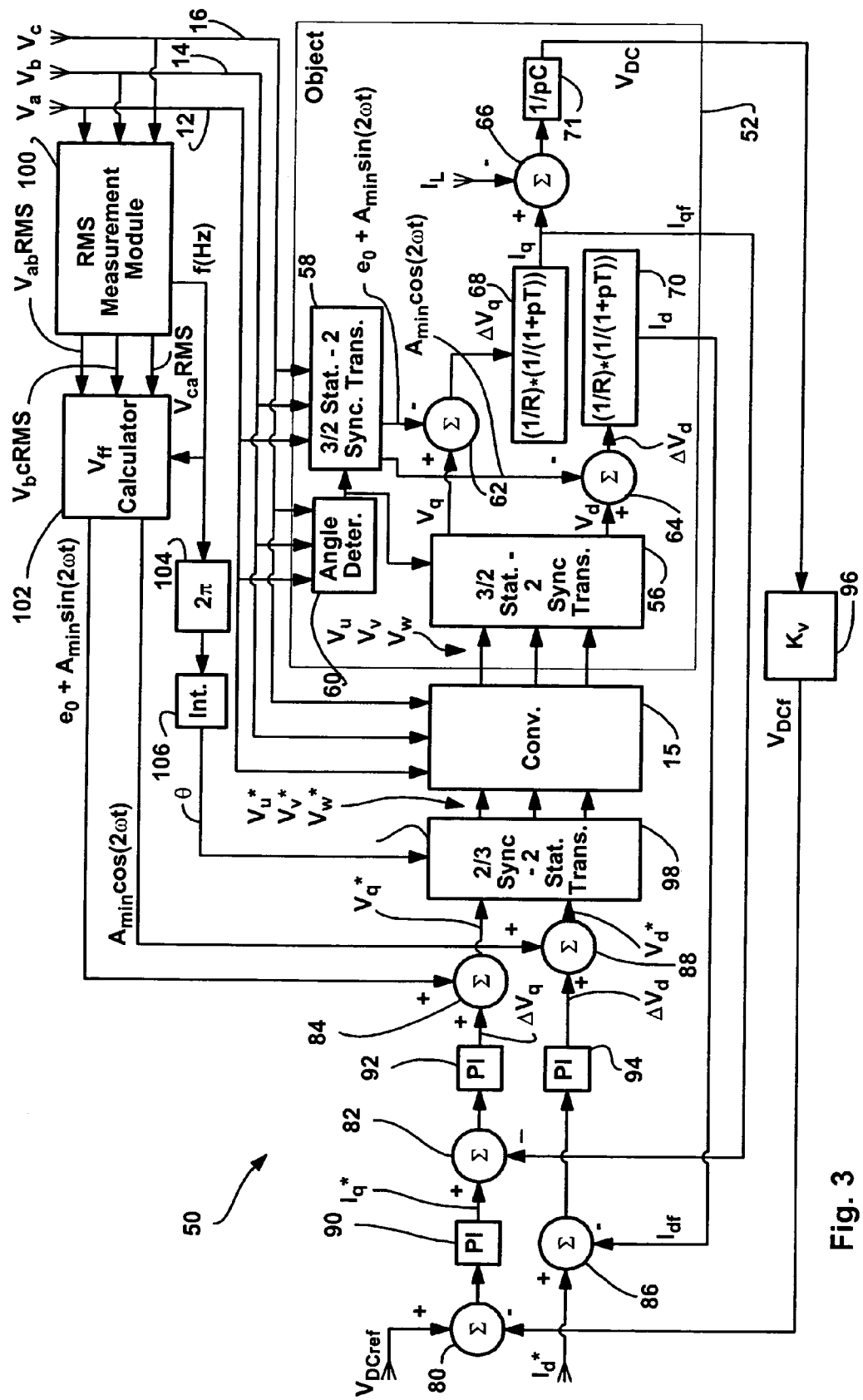
FIG. 3 is schematic diagram illustrating a controller and a two phase object model according to at least some embodiments of the present invention.

Referring now to FIG. 3, an exemplary controller 50 linked to a converter 15 is illustrated. Controller 50 receives a DC bus voltage reference value $V_{DCref}$ and controls converter 15 so that converter 15 generates a DC bus voltage $V_{DC}$ (see again FIG. 1) that is equal to the reference voltage $V_{DCref}$. In this regard, as illustrated in FIGS. 1 and 3, three phase supply line voltages $V_a$, $V_b$ and $V_c$ are provided to converter 15 and converter 15 is controlled in a manner consistent with command voltage values $V^*_u$, $V^*_v$ l and $V^*_w$ to cause the DC bus voltage to track the reference voltage $V_{DCref}$.

In addition to the controller 50 and converter 15, a synchronous two phase dq reference frame object model 52 is illustrated for discussion purposes to simulate converter operation when unbalanced supply line voltages occur on lines 12, 14 and 16. Object model 52 includes an angle θ determiner 60, two stationary three-phase to synchronous two phase transformers 56 and 58, three summers 62, 64 and 66 and three scalar modules 68, 70 and 71.

As its label implies, angle determiner 60 is linked to the three phase supply lines 12, 14 and 16 and identifies a supply voltage angle θ which is provided to each of transformers 56 and 58. Transformer 56 transforms the stationary three-phase voltage values $V_u$, $V_v$ and $V_w$ from converter 15 to two-phase synchronous voltages $V_q$ and $V_d$ in the dq reference frame. Similarly, transformer 58 transforms the supply line voltage values $V_a$, $V_b$ and $V_c$ into d and q values that include second harmonic components. Here, as illustrated and, consistent with the discussion above, the d and q second harmonic components are represented by values $A_{min}$ Cos (2ωt) and $A_{min}$ Sin (2ωt), respectively. In addition to the second harmonic component $A_{min}$ Sin (2ωt), the q-axis value includes a DC offset $e_0$.

Summer 62 subtracts value $e_0 + A_{min}$ Sin (2ωt) from q-axis voltage $V_q$ thereby generating a q-axis difference voltage value $\Delta V_q$. Similarly, summer 64 subtracts d-axis second harmonic value $A_{min}$ Cos (2ωt) from d-axis voltage $V_d$ thereby generating a d-axis difference voltage value $\Delta V_d$. The difference values $\Delta V_q$ and $\Delta V_d$ are provided to modules 68 and 70, respectively, where each is multiplied by a scalar consistent with Equations 46 and 47 described above thereby generating q and d-axis currents $1_q$ and $1_d$, respectively. Q-axis current $1_q$ is provided to third summer 66 which subtracts a load current $1_L$ and provides it's output to module 71. Module 71 divides the value received from summer 66 by the derivative of the value of capacitor 40 (see again FIG. 1) thereby providing a DC bus voltage value $V_{DC}$.

Referring still to FIG. 3, each of the d and q-axis currents $I_d$ and $I_q$ are provided as feedback currents $I_{df}$ and $I_{qf}$ to controller 50. While this feedback process is shown in a simplified form in FIG. 3, it should be appreciated that in an actual implementation the feedback process would be more complicated and require measurement of supply line currents and conversion to the dq reference frame. In addition to the d and q currents, the bus voltage value $V_{DC}$ is fed back to controller 50 which includes a gain block 96 that steps up the bus value $V_{DC}$ by a scalar $K_v$ to a value $V_{DCf}$ suitable for comparison to reference value $V_{DCref}$.

Referring still to FIG. 3, controller 50 includes five summers 80, 82, 84, 86 and 88, three proportional/integral (PI) regulators 90, 92 and 94, a two phase synchronous to three phase stationary transformer 98, a line-to-line RMS measurement module 100, a feedforward voltage calculator 102, a scalar module 104 and an integrator 106.

RMS measurement module 100 is linked to supply lines 12, 14 and 16 and measures the line-to-line RMS voltage values $V_{ab\_RMS}$, $V_{bc\_RMS}$ and $V_{ca\_RMS}$. In addition, RMS measurement module 100 identifies the frequency of the supply voltages $V_a$, $V_b$ and $V_c$ in hertz and provides that value to scalar module 104. The RMS voltage values are provided to calculator 102. Calculator 102 uses the RMS voltage values to identify the DC offset $e_0$ and the d and q-axis second harmonic components $A_{min}$ cos(2ωt) and $A_{min}$ sin(2ωt), respectively. The sum of the DC offset value and the q-axis second harmonic component are provided to summer 84. Similarly, the d-axis second harmonic component is provided to summer 88. Scalar module 104 multiplies the frequency by 2π and provides its output to integrator 106. Integrator 106 integrates the value received from module 104 and provides an angle θ value to transformer 98.

Referring still to FIG. 3, summer 80 subtracts the DC feedback voltage value $V_{DCf}$ from the DC reference voltage value $V_{DCref}$ and provides its output to Pl regulator 90. Regulator 90 steps up the value received from summer 80 and provides its output as a q-axis command current $1^*_q$ to summer 82. Summer 82 subtracts the q-axis feedback current $1_{qf}$ from the q-axis command current $1^*_q$ and provides its output to P regulator 92. Regulator 92 steps up the value it receives from summer 82 and provides its output as a q-axis difference voltage value $\Delta V_q$ to summer 84. Difference value $\Delta V_q$ is akin to the output of summer 62 in object 52 and therefore, if value $e_0 + A_{min}$ Sin (2ωt) is added to value $\Delta V_q$, the modification will compensate for the subsequent effect of summer 64 in object model 52. To this end, summer 84 adds value $\Delta V_q$ to the q-axis value (i.e., $e_0 + A_{min}$ Sin (2ωt)) received from calculator 102 and provides its output as a q-axis command voltage $V^*_q$ to transformer 98.

The d-axis feedback current $1_{df}$ is subtracted from a d-axis command current $1^*_d$ by summer 86 which provides its output to Pl regulator 94. Regulator 94 steps up the value received from summer 86 and provides its output as a d-axis difference voltage value $\Delta V_d$ to summer 88. Difference value $\Delta V_d$ is akin to the output of summer 64 in object 52 and therefore, if value $A_{min}$ Cos(2ωt) is added to value $\Delta V_d$, the modification will compensate for the subsequent effect of summer 62 in object model 52. To this end, summer 88 adds the d-axis difference voltage value $\Delta V_d$ to the d-axis second harmonic component $A_{min}$ cos(2ωt) received from calculator 102 and provides its output as a d-axis command voltage value $V^*_d$ to transformer 98.

Transformer 98 transforms the q and d-axis voltage command values $V^*_q$ and $V^*_d$ to three-phase stationary command voltage values $V^*_u$, $V^*_v$ and $V^*_w$ which are provided to converter 54. Although not illustrated, converter 15 uses values $V^*_u$, $V^*_v$ and $V^*_w$ to control switches (e.g., see 18, 20, 22, 24, 26 and 28) to generate the DC bus voltage $V_{DC}$ across buses 36 and 38.

Figure 4:
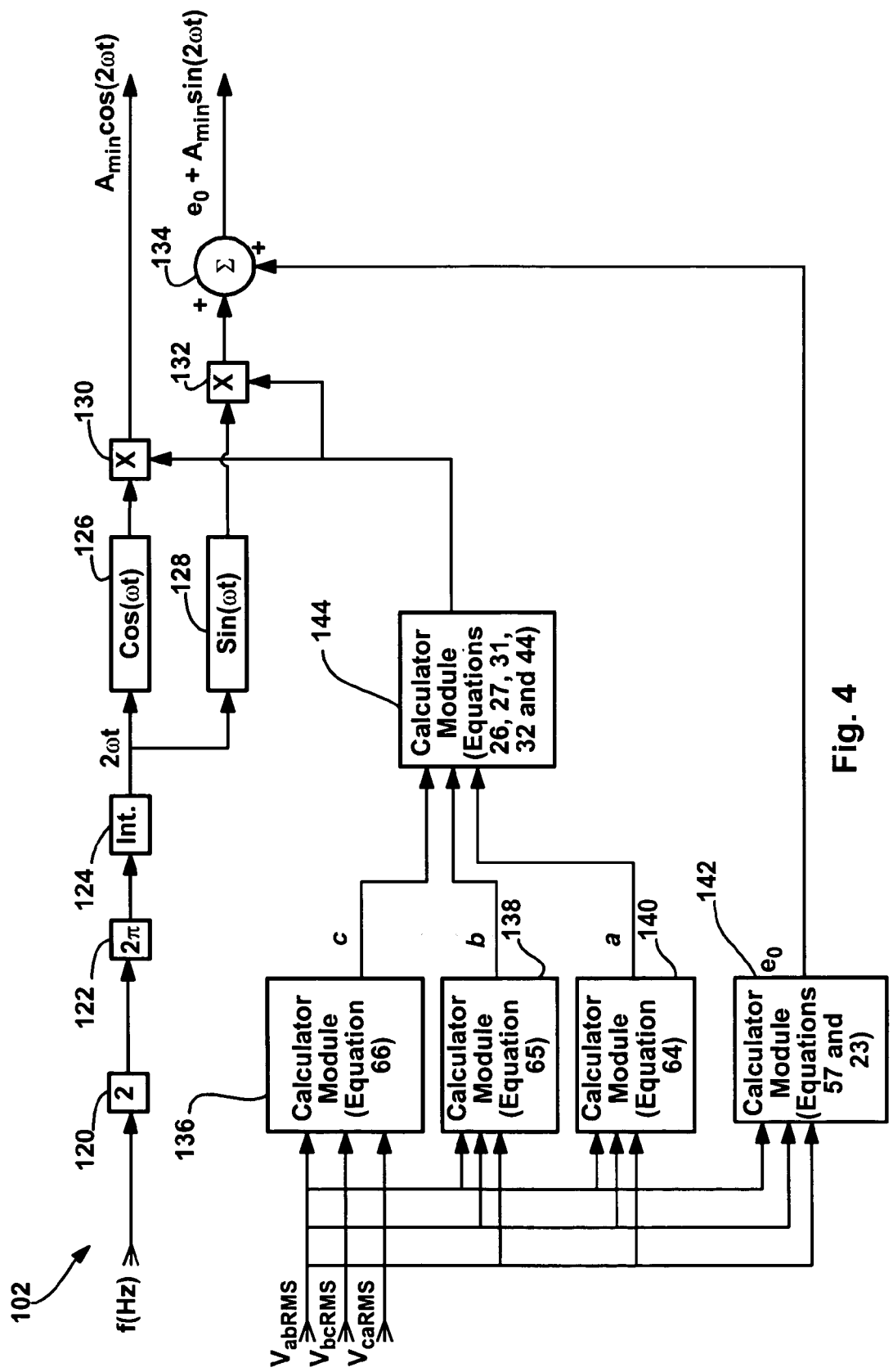
FIG. 4 is a schematic diagram illustrating detailed components of the feedforward voltage calculator of FIG. 3.

Referring to FIG. 4, exemplary $V_{ff}$ calculator 102 is illustrated. Exemplary calculator 102 includes two scalar modules 120 and 122, an integrator 124, a cosine module 126, a sine module 128, first and second multipliers 130 and 132, a summer 134 and five calculator modules 136, 138, 140, 142 and 144. The supply voltage frequency is doubled by module 120 which provides its output to module 122. Module 122 multiplies $2\pi$ by the value received from module 120 and provides its output as the second harmonic frequency to integrator 124. Integrator 124, as its label implies, integrates the value it receives and provides an angle value corresponding to the second harmonic of the supply voltages to each of the cosine and sine modules 126 and 128. Cosine module 126 generates the cosine of the received angle and provides that value to multiplier 130. Similarly, sine module 128 generates the sine of the angle received and provides its output to multiplier 132.

Referring still to FIG. 4, first calculator module 136 receives each of the line-to-line RMS voltage values and solves equation 66 to identify peak phase value c which is provided to fifth calculator module 144. Similarly, modules 138 and 140 receive the line-to-line RMS voltage values and solve equations 65 and 64, respectively, to identify the peak phase values b and a, respectively, each of which are provided to fifth calculator module 144.

Calculator module 142 receives the line-to-line RMS voltage values and solves equation 57 to identify the combined value of peak values a, b and c. Thereafter, module 142 divides the combined value by three to identify value $e_0$ in a manner consistent with equation 23 above.

Calculator module 144 solves equations 26, 27, 31, 32 and 44 to identify amplitude value $A_{min}$. Value $A_{min}$ is provided to each of multipliers 130 and 132 and is multiplied by the cosine and sine values generated by modules 126 and 128, respectively. The output of multiplier 130 is the d-axis second harmonic component $A_{min} \cos(2\omega t)$. The output of multiplier 132 is provided to summer 134 and is added to values $e_0$ thereby generating the q-axis component $e_0 + A_{min} \sin(2\omega t)$ which includes the q-axis second harmonic component. Values $A_{min} \cos(2\omega t)$ and $e_0 + A_{min} \sin(2\omega t)$ are provided to summers 88 and 84 as described above to pre-compensate for second harmonics that would occur on the supply lines during active converter control when the supply line voltages are unbalanced.

Second Embodiment

While most control configurations operate in the synchronous two-phase dq reference frame, it is possible to configure a controller that operates in the three phase stationary frame of reference. In this case, Equations 1 through 3 and Equations 64 through 66 can be used to identify three phase feed forward voltages to substantially eliminate the second harmonic components in the line voltages and to reduce DC bus ripple.

Figure 5:
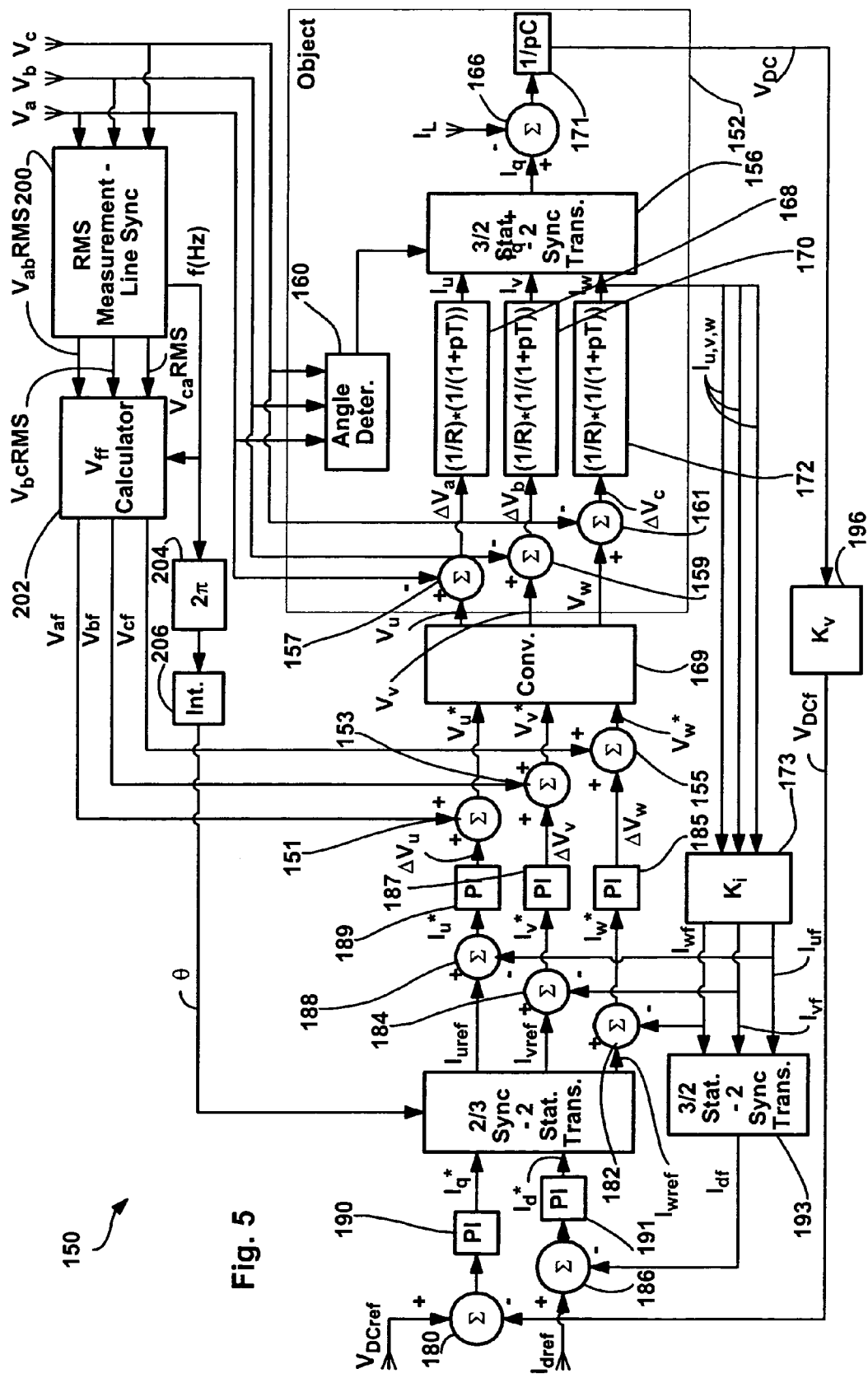
FIG. 5 is similar to FIG. 3, albeit illustrating a three phase controller and a three phase object model consistent with at least some embodiments of the present invention.

Referring now to FIG. 5, a schematic diagram similar to the diagram provided in FIG. 3 as illustrated that includes a three phase object model 152 to illustrate the effects of active conversion with unbalanced supply line voltages, a three phase controller 150 and a converter 169. Converter 169 receives the supply line voltages $V_a$, $V_b$ and $V_c$ and generates voltage values $V_u$, $V_v$ and $V_w$ as a function of command voltages $V^*_u$, $V^*_v$ and $V^*_w$.

Object model 152 includes four summers 157, 159, 161 and 166, an angle determiner 160, four scalar modules 168, 170, 172 and 171 and a three phase stationary to two phase synchronous transformer 156. Summer 157 subtracts the line voltage value $V_a$ from node voltage value $V_u$ and provides its output to module 168. Similarly, summer 159 subtracts the line voltage value $V_b$ from node voltage value $V_v$ and provides its output to module 170 while summer 161 subtracts line voltage value $V_c$ from node voltage value $V_w$ and provides its output to module 172. The outputs of summers 157, 159 and 161 are three phase difference voltage values $\Delta V_a$, $\Delta V_b$ and $\Delta V_c$, respectively. Referring once again to FIG. 1, the difference values $\Delta V_a$, $\Delta V_b$ and $\Delta V_c$ represent the potentials across the inductive and resistive values in line 12, 14 and 16. Each of modules 168, 170 and 172 multiplies the received difference value by a scalar consistent with Equations 4, 5 and 6 described above thereby generating values corresponding to three phase line currents $I_u$, $I_v$ and $I_w$. Current values $I_u$, $I_v$ and $I_w$ are provided to transformer 156 which transforms those three phase stationary values to two phase synchronous values $I_q$ and $I_d$. In FIG. 5, value $I_d$ is not shown as that value is not important from the perspective of object 152 and how that object is employed for the purposes of the present invention. Q-axis current value $I_q$ is provided to summer 166. Summer 166 subtracts the load current $I_L$ from the q-axis current $I_q$ and provides its output to scalar module 171. Module 171 divides the value received from summer 166 by the derivative of the value of capacitor 40 (see again FIG. 1) thereby providing a DC bus voltage value $V_{DC}$.

Referring still to FIG. 5, each of the three phase line current values $l_u$, $l_v$ and $l_w$ are stepped up by a gain module 173, the stepped up values being provided as three phase feedback currents $l_{vf}$, $l_{uf}$ and $l_{wf}$ to controller 150. In addition, the bus voltage value $V_{DC}$ is fed back to controller 150 that includes a gain block 196 that steps up the bus value $V_{DC}$ by a scalar $K_v$ to a value $V_{DCf}$ suitable for comparison to reference value $V_{Dcref}$.

Controller 150 includes eight summers 180, 186, 182, 184, 188, 151, 153 and 155, five PI regulators 190, 191, 185, 187 and 189, two signal transformers 177 and 193, a line-to-line RMS measurement module 200, a feed forward voltage calculator 202, a scalar module 204 and an integrator 206.

RMS measurement module 200 is akin to module 100 in FIG. 3 and provides as outputs line-to-line RMS voltage values as well as a line frequency value in hertz. Calculator 202 uses the RMS voltage values to identify three phase feed forward voltage values $V_{aff}$, $V_{bff}$ and $V_{cff}$ which are provided to summers 151, 153 and 155, respectively. Scalar module 204 multiplies the frequency received from module 200 by $2\pi$ and provides its output to integrator 206. Integrator 206 integrates the value received from module 204 and provides an angle value to transformer 177.

Referring still to FIG. 5, summer 180 subtracts the DC feedback voltage value $V_{DCf}$ from the DC reference voltage value $V_{Dcref}$ and provides its output to regulator 190. Regulator 190 steps up the value received from summer 180 and provides its output as a q-axis command current $1^*_q$ to transformer 177.

The feedback current values $l_{vf}$, $l_{uf}$ and $l_{wf}$ are provided to the three-to-two phase transformer 193 which generates a d-axis feedback current value $l_{df}$. Summer 186 subtracts the d-axis feedback current $l_{df}$ from a d-axis reference current $1_{dref}$ and provides the difference to PI regulator 191. Regulator 191 steps up the value received from summer 186 and provides its output as a d-axis command current $1^*_d$ to transformer 177.

Transformer 177 transforms the d and q-axis command currents $1^*_d$ and $1^*_q$ to three phase stationary reference current values $1_{uref}$, $1_{vref}$ and $1_{wref}$ which are provided to summers 188, 184 and 182. Summer 188 subtracts feedback current $l_{uf}$ from reference current $1_{uref}$ and provides its output as a command current $I^*_u$ to controller 189. Similarly, summer 184 subtracts feedback current $l_{vf}$ from reference current $l_{vref}$ and provides its output as a command current $I^*_v$ to controller 187 while summer 182 subtracts feedback current $l_{wf}$ from reference current $l_{wref}$ and provides its output as a command current $I^*_w$ to controller 185. Each of controllers 185, 187 and 189 steps up the value received and provides a difference voltage value as an output. To this end, controller 185 provides difference value $\Delta V_w$, controller 187 provides difference value $\Delta V_v$ and controller 189 provides value $\Delta V_u$ to summers 155, 153, and 151 respectively. Summer 151 adds the difference value $\Delta V_u$ and the feedforward voltage value $V_{aff}$ and provides its output as a command voltage value $V^*_u$ to converter 169. Similarly, summer 153 adds difference value $\Delta V_v$ and feedforward voltage value $V_{bff}$ providing its output is a command voltage value $V^*_v$ and summer 155 adds difference value $\Delta V_w$ and feedforward voltage $V_{cff}$ and provides its output as command voltage value $V^*_w$ to converter 169.

Figure 6:
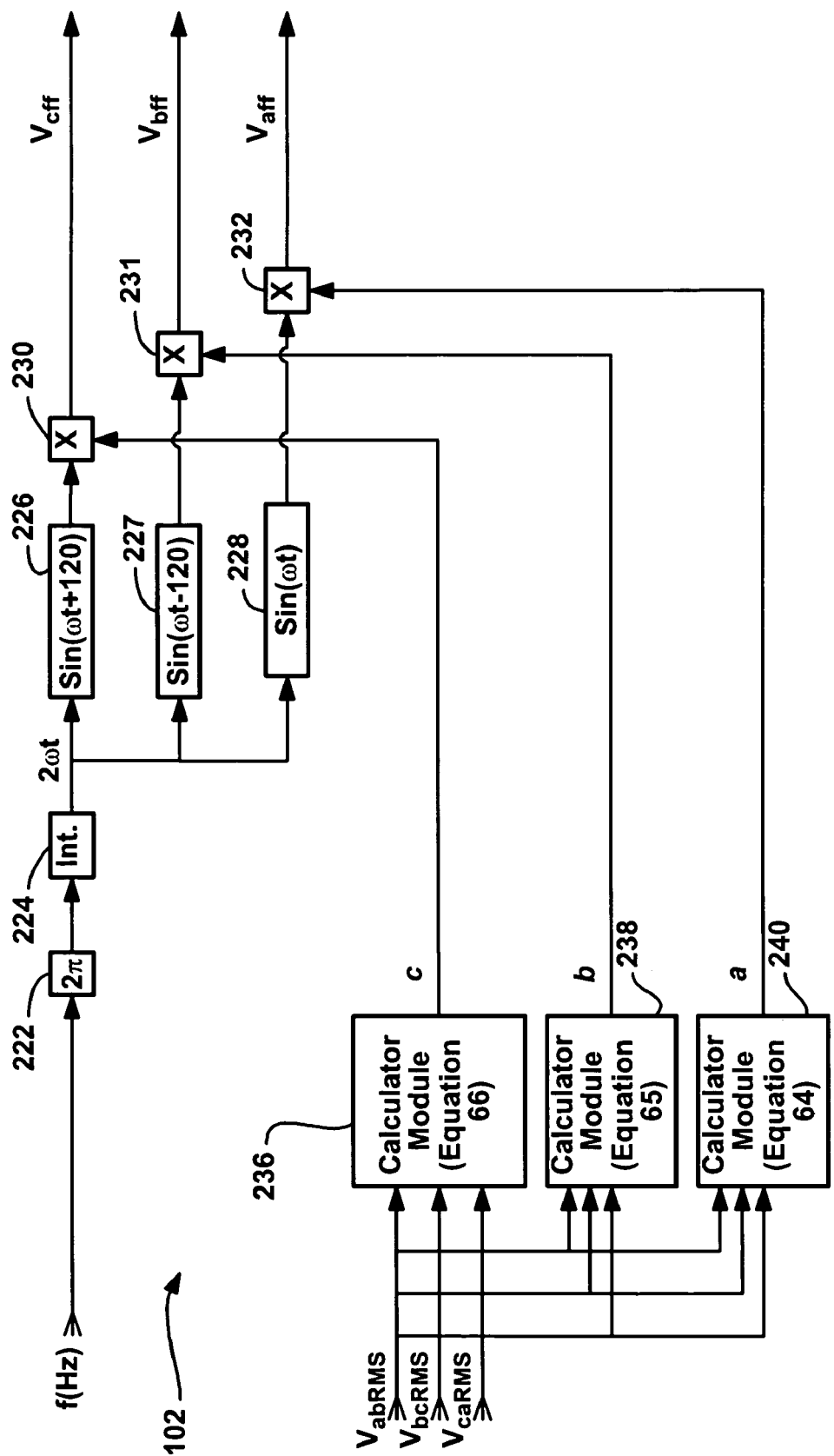
FIG. 6 is a schematic diagram illustrating detail of at least one exemplary feedforward voltage calculator that may be used in the configuration of FIG. 5.

Referring now to FIG. 6, exemplary calculator 202 is illustrated. Exemplary calculator 202 includes one scalar module 222, an integrator 224, three sign modules 226, 227 and 228, three multipliers 230, 231 and 232 and three calculator modules 236, 238 and 240. Module 222 multiplies $2\pi$ by the supply line frequency and provides its output to integrator 224 which, as its label implies, integrates the value received and provides an angle value to each of sign modules 226, 227 and 228. Sign module 228 generates the sign of the angle received and provides its output to multiplier 232. Module 227 generates the sign of the angle received less 120 degrees and provides its output to multiplier 231. Module 226 generates the sign of the received angle plus 120 degrees and provides its output to multiplier 230. At this point it should be appreciated that the outputs of modules 228, 227 and 226 provide a portion of the solution to equations 1, 2 and 3 above. Calculator modules 240, 238 and 236 provide the other parts of equations 1-3 above. To this end, modules 240, 238 and 236 solve equations 64, 65 and 66 to identify the peak voltage values a, b and c, respectively. Values a, b and c are provided to multipliers 232, 231 and 230 where they are multiplied by the outputs of modules 228, 227 and 226 to provide feedforward voltage values $V_{aff}$, $V_{bff}$ and $V_{cff}$, respectively. Values $V_{aff}$, $V_{bff}$ and $V_{cff}$ are provided to summers 151, 153 and 155 to compensate for the unbalance in line voltages $V_a$, $V_b$ and $V_c$.

Figure 7:
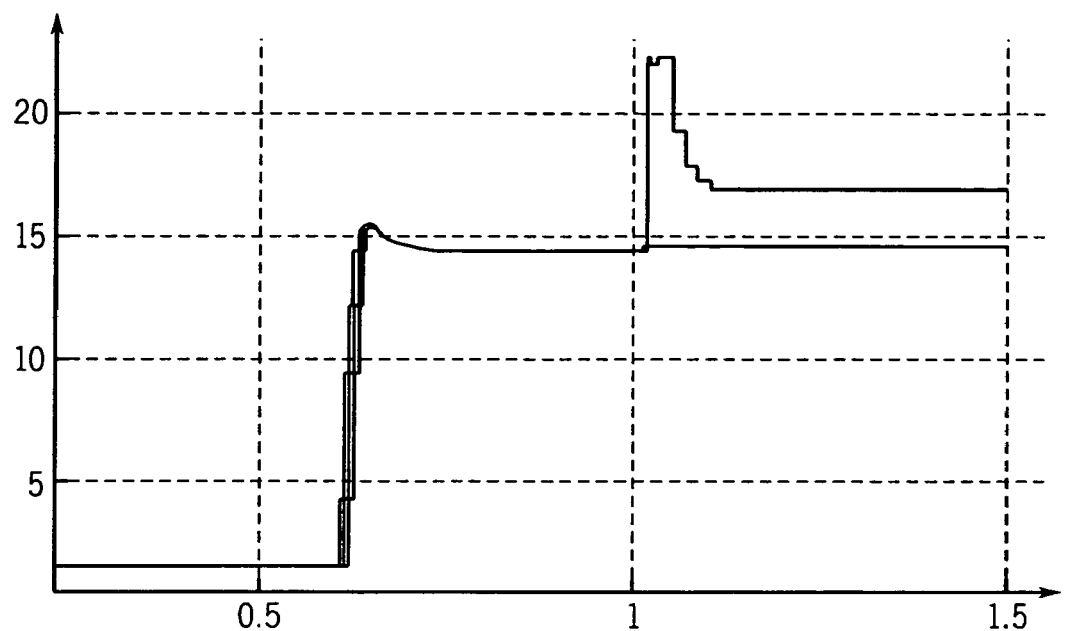
FIG. 7 is a graph illustrating RMS current waveforms generated using a conventional dq current loop controller where supply line voltages were balanced prior to time 1.0 and unbalanced thereafter.

Referring now to FIG. 7, u, v and w phase RMS currents are illustrated that were generated using a conventional dq current loop controller where the AC line voltage source was balanced up to time 1 and thereafter was unbalanced. In the illustrated example, phase u was unbalanced by −10 percent, phase v was unbalanced by −8 percent and phase w was unbalanced by +4 percent. Clearly at time 1, the unbalance causes unbalanced RMS currents to occur.

Figure 8:
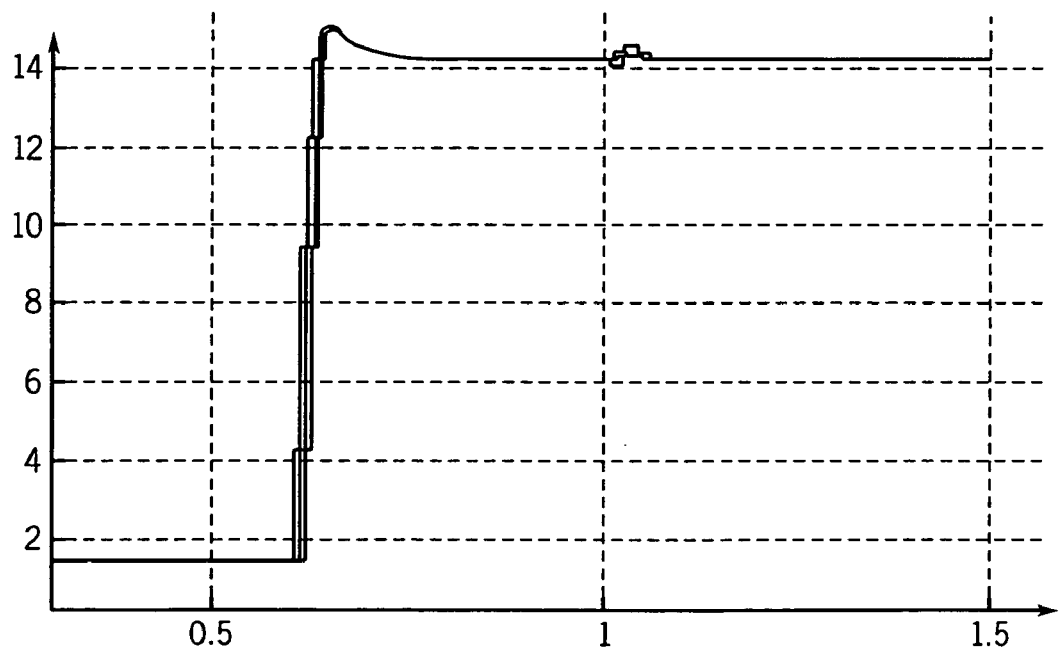
FIG. 8 is similar to FIG. 7, albeit illustrating waveforms generated using a controller operated in accordance with the present invention.

Referring to FIG. 8, three phase RMS currents similar to those of FIG. 7 are illustrated where, again, the voltage source was balanced up to time 1 and thereafter was unbalanced to a similar degree as that described above. In FIG. 8, however, a controller operated in a manner consistent with the present invention described above was employed that controlled individual phase currents in a three phase manner. Clearly the unbalance shown in FIG. 7 is substantially reduced in FIG. 8.

Figure 9:
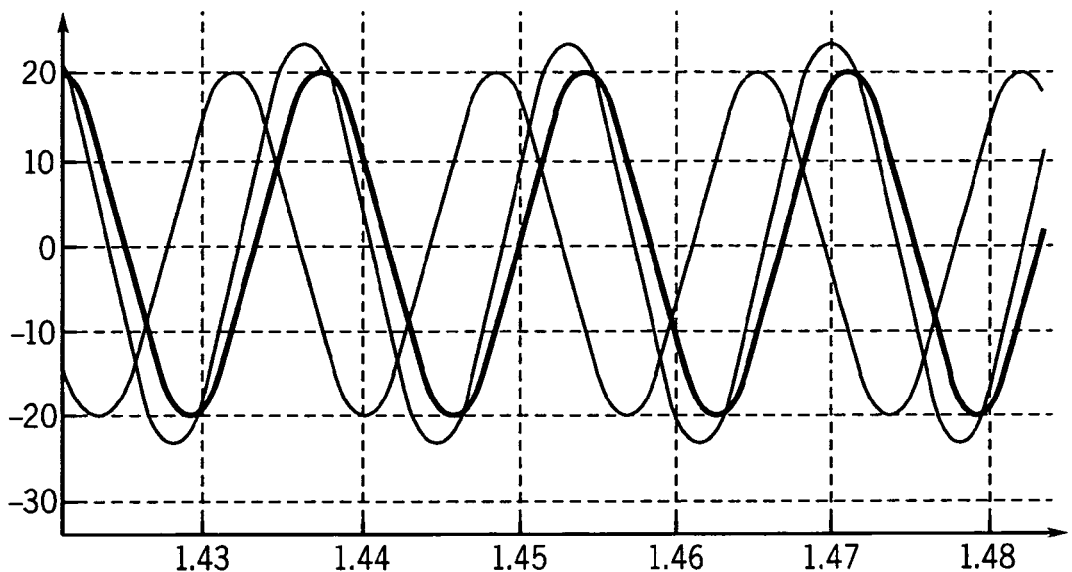
FIG. 9 is a graph illustrating steady state current waveforms generated using a conventional dq current loop controller.
Figure 10:
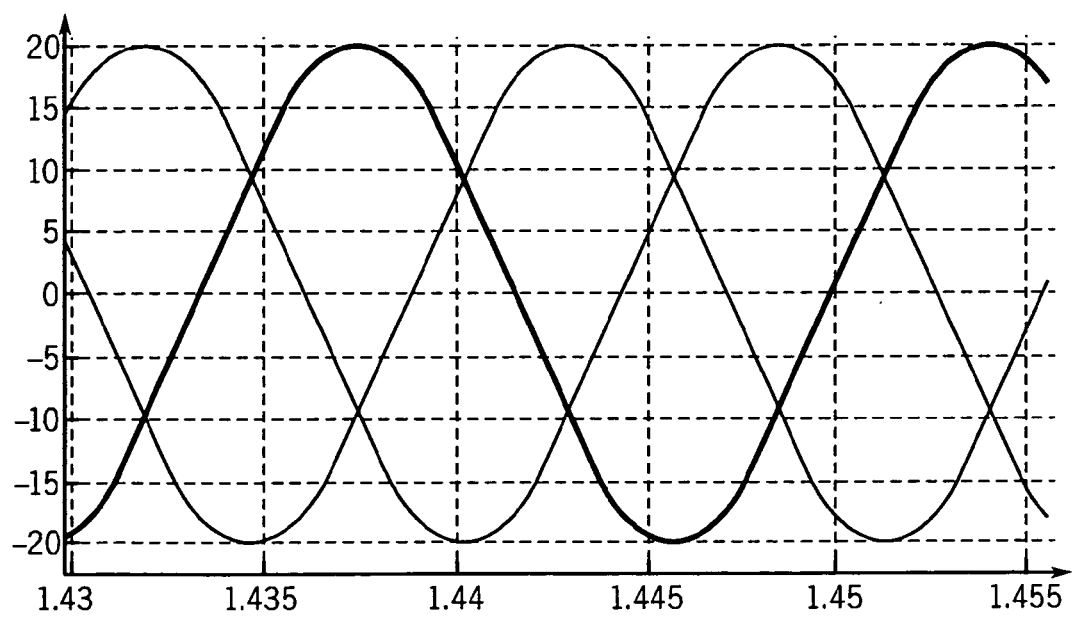
FIG. 10 is similar to FIG. 9, albeit illustrating steady state current waveforms generated using a controller operated in a manner consistent with the present invention.

Referring to FIG. 9, FIG. 9 illustrates three phase steady state currents when the line voltages are unbalanced with a conventional dq current loop controller. As illustrated, the currents change amplitude and phase due to the unbalanced source with the conventional dq current loop controller. In contrast, in FIG. 10 it can be seen that the steady state currents that result when a controller operated in a manner consistent with the teachings of the present invention is used do not change amplitude or phase.

Figure 11:
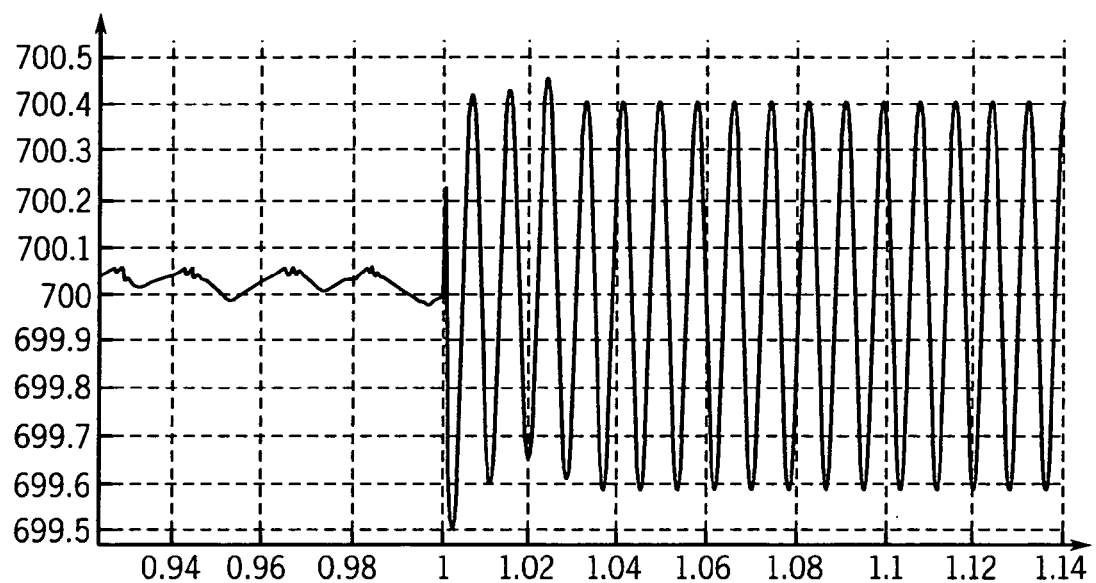
FIG. 11 is a graph illustrating a DC bus voltage waveform generated using a conventional dq current loop controller where supply line voltages were balanced prior to time 1.0 and unbalanced thereafter.
Figure 12:
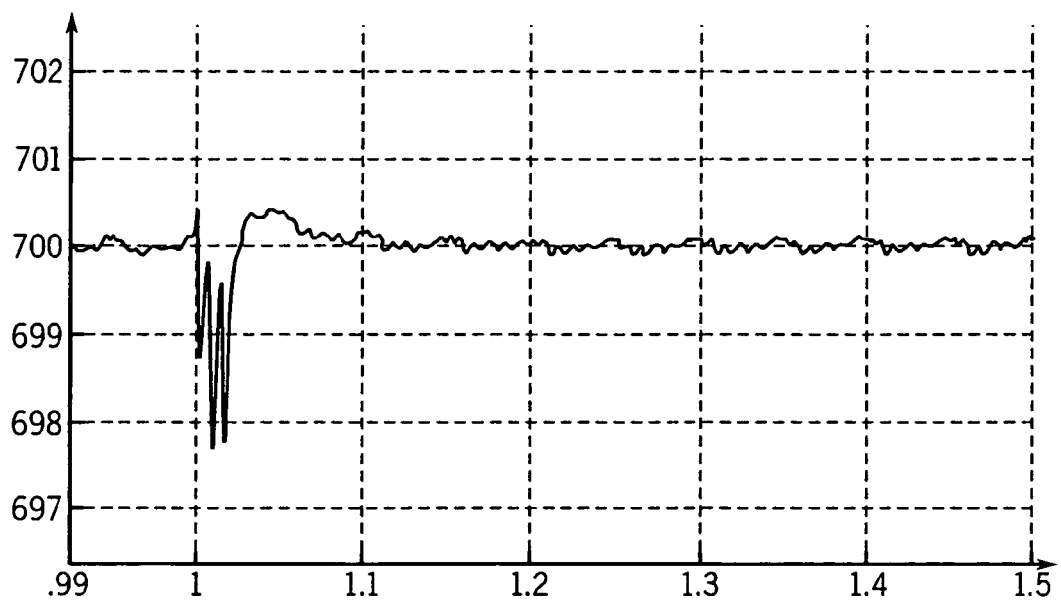
FIG. 12 is similar to FIG. 11, albeit illustrating a DC bus voltage waveform generated using a controller operated in a manner consistent with the present invention.

Referring to FIG. 11, a DC bus voltage waveform is illustrated where the voltage source was balanced until time 1 and thereafter was unbalanced. It can be seen that after time 1, a large second harmonic ripple appears. In contrast, referring to FIG. 12 where an individual phase current control scheme was employed as consistent with the present invention, when the voltage source becomes unbalanced at time 1, while there is a short transient ripple, the ripple is quickly eliminated.

Figure 13:
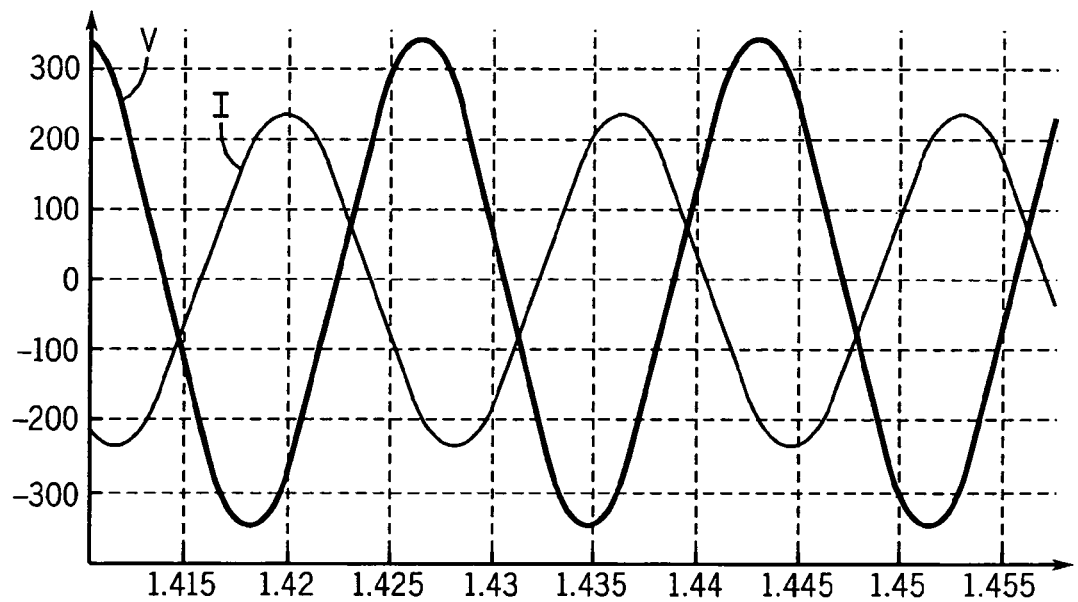
FIG. 13 is a graph illustrating steady state phase voltage and current waveforms generated using a conventional dq current loop controller where supply line voltages were balanced prior to time 1.0 and unbalanced thereafter.
Figure 14:
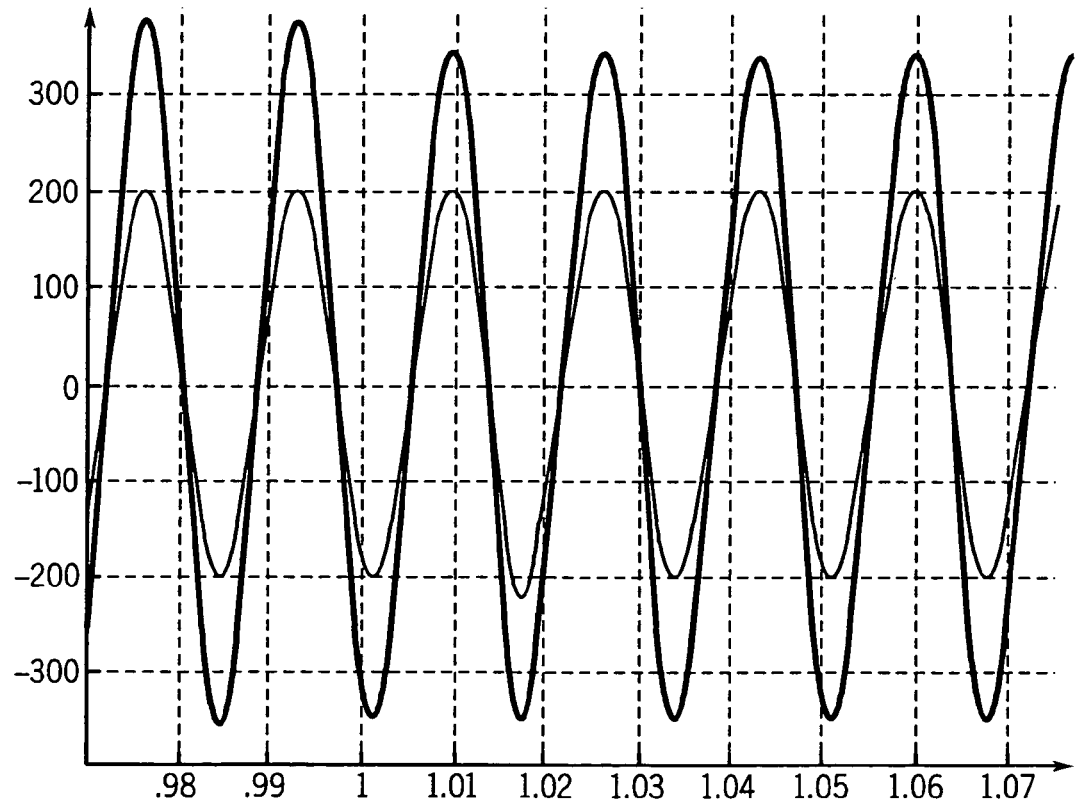
FIG. 14 is a graph similar to FIG. 13, albeit illustrating waveforms generated using a controller operated in a manner consistent with the present invention.

Referring now to FIG. 13, waveforms representing steady state phase voltage V and current 1 that result from a conventional dq current loop controller where the AC line voltage source is unbalanced are illustrated. It should be appreciated that the power factor is not unity when the voltage source is unbalanced. In FIG. 14, voltage and current waveforms similar to those in FIG. 13 are illustrated where the AC line voltage source was balanced up to time 1 and was unbalanced thereafter. The system used to generate the waveforms of FIG. 14 employed a control scheme consistent with the present invention. As can be seen, the power factor associated with the waveforms of FIG. 14 is unity both when the line voltage source is balanced and unbalanced when the inventive concepts are employed.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims.

To apprise the public of the scope of this invention, the following claims are made:

What is claimed is:

1. A method for use with a controller and a converter where the controller actively controls the converter to convert three phase voltages on three supply lines to a DC voltage across positive and negative DC buses, the method comprising the steps of:

identifying the peak amplitudes of the three phase supply line voltages;

using the peak amplitudes to identify a second harmonic component that would be generated on the supply lines by the converter during normal operation due to unbalance in the peak amplitudes; and altering control of the converter as a function of the identified second harmonic.

2. The method of claim 1 wherein the controller generates command voltages to control the converter, the step of altering control of the converter including modifying the command voltages as a function of the identified second harmonic.

3. The method of claim 2 wherein the step of identifying the peak amplitudes includes sensing the RMS line-to-line voltages and using the RMS line-to-line voltages to identify the peak amplitudes.

4. The method of claim 3 wherein the step of identifying the peak amplitudes includes the step of solving the following equations:

$$a = \sqrt{\frac{2}{3}} \cdot V_{ab\_RMS} + \sqrt{\frac{3}{2}} \cdot \frac{(V_{ca\_RMS}^2 - V_{bc\_RMS}^2)}{V_{ab\_RMS} + V_{bc\_RMS} + V_{ca\_RMS}}$$

$$b = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}}$$

$$c = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{ca\_RMS}},$$

where a, b and c are the peak amplitudes and where $V_{ab\_RMS}$, $V_{bC\_RMS}$ and $V_{ca\_RMS}$ are the first, second and third RMS line-to-line voltages that occur between the first and second, second and third and third and first lines, respectively.

5. The method of claim 2 wherein the controller receives a DC reference voltage and controls the converter to cause the DC voltage across the DC buses to track the reference voltage, the method further including the step of using the reference voltage to identify d and q-axis voltage difference values, the step of identifying the second harmonic components including the step of identifying d and q-axis components of the second harmonic, the step of modifying the command voltages including mathematically combining the difference values and the second harmonic components to identify two phase d and q-axis command voltages.

6. The method of claim 5 wherein the step of mathematically combining includes adding the d and q-axis second harmonic components to the d and q-axis difference values.

7. The method of claim 6 further including the step of using the peak amplitudes to identify a DC offset and wherein the step of modifying the command voltages further includes adding the DC offset to the q-axis difference value along with the q-axis second harmonic component.

8. The method of claim 5 wherein the peak amplitudes of the three supply line voltages are a, b and c and wherein the step of identifying the d and q axis second harmonic components includes using the peak amplitudes to identify a two phase amplitude $A_{min}$ by solving the following equation:

$$A_{min} = \frac{A_\alpha \cdot \text{Sin}(\varphi_\alpha) + A_\beta \cdot \text{Cos}(\varphi_\beta)}{2}$$

where:

$$A_\alpha = \frac{e_0^*}{3} \cdot \sqrt{(a^* + b^*)^2 + (a^* + c^*)^2 + 2(a^*)^2 - b^* \cdot c^*}$$

$$A_\beta = \frac{e_0^*}{\sqrt{3}} \cdot \sqrt{(b^* + c^*)^2 - b^* \cdot c^*}$$

$$\varphi_\alpha = \text{arc}tg\left[\frac{\sqrt{3} \cdot (b^* - c^*)}{4a^* + b^* + c^*}\right]$$

$$\varphi_\beta = \text{arc}tg\left[\frac{\sqrt{3} \cdot (b^* + c^*)}{b^* - c^*}\right]$$

where:

$$e_0^* = \frac{a+b+c}{3}; \text{ and}$$

$$a^* = \frac{a}{e_0^*}; b^* = \frac{b}{e_0^*}; c^* = \frac{c}{e_0^*}.$$

9. The method of claim 8 further including the step of identifying the frequency of the second harmonic of the supply line voltages and using the frequency to identify a two phase supply voltage angle, the step of identifying the second harmonic components including identifying the q-axis second harmonic component by multiplying value $A_{min}$ by the sine of the voltage angle and identifying the d-axis second harmonic component by multiplying value $A_{min}$ by the cosine of the voltage angle.

10. The method of claim 5 wherein the step of using the reference voltage to identify d and q-axis voltage difference values includes using the reference voltage to identifying d and q-axis command currents, obtaining d and q-axis feedback currents, subtracting the d and q-axis feedback currents from the d and q-axis command currents, respectively, and using the d and q-axis command currents to identify the voltage difference values.

11. The method of claim 2 wherein the controller receives a DC reference voltage and controls the converter to cause the DC voltage across the DC buses to track the reference voltage, the method further including the step of using the reference voltage to identify first, second and third phase voltage difference values, the step of identifying the second harmonic components including the step of identifying first, second and third phase components of the second harmonic corresponding to the first, second and third supply lines, respectively, the step of modifying the command voltages including mathematically combining the difference values and the second harmonic components to identify first, second and third command voltages.

12. The method of claim 11 wherein the step of mathematically combining includes adding the first, second and third phase second harmonic components to the first, second and third phase difference values.

13. The method of claim 11 wherein the step of identifying the peak amplitudes includes the step of solving the following equations:

$$a = \sqrt{\frac{2}{3}} \cdot V_{ab\_RMS} + \sqrt{\frac{3}{2}} \cdot \frac{(V_{ca\_RMS}^2 - V_{bc\_RMS}^2)}{V_{ab\_RMS} + V_{bc\_RMS} + V_{ca\_RMS}}$$

$$b = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}}$$

$$c = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{ca\_RMS}},$$

where a, b and c are the peak amplitudes and where Vab_RMS, Vbc_RMS and Vca_RMS are the first, second and third RMS line-to-line voltages that occur between the first and second, second and third and third and first lines, respectively.

14. The method of claim 11 further including the step of identifying the frequency of the supply line voltages and using the frequency to identify a supply voltage angle, the step of identifying the second harmonic components including identifying the q-axis second harmonic component by multiplying peak values a, b and c by the sine of the supply voltage angle, the sine of the supply voltage angle less 120 degrees and the sine of the supply voltage angle plus 120 degrees, respectively.

15. The method of claim 11 wherein the step of using the reference voltage to identify voltage difference values includes using the reference voltage to identifying first, second and third phase reference currents, obtaining first, second and third phase feedback currents, subtracting the first, second and third phase feedback currents from the first, second and third reference currents to identify first, second and third command currents, respectively, and using the first, second and third phase command currents to identify the voltage difference values.

16. An apparatus for use with a converter where the converter is actively controlled to convert three phase voltages on three supply lines to a DC voltage across positive and negative DC buses, the apparatus comprising:
a processor programmed to perform the steps of:
identifying the peak amplitudes of the three phase supply line voltages;
using the peak amplitudes to identify a second harmonic component that would be generated on the supply lines by the converter during normal operation due to unbalance in the peak amplitudes; and
altering control of the converter as a function of the identified second harmonic.

17. The apparatus of claim 16 wherein the processor is further programmed to generate command voltages to control the converter, the processor performing the step of altering control of the converter by modifying the command voltages as a function of the identified second harmonic.

18. The apparatus of claim 17 wherein the processor performs the step of identifying the peak amplitudes by sensing the RMS line-to-line voltages and using the RMS line-to-line voltages to identify the peak amplitudes.

19. The apparatus of claim 18 wherein the processor performs the step of identifying the peak amplitudes by solving the following equations:

$$a = \sqrt{\frac{2}{3}} \cdot V_{ab\_RMS} + \sqrt{\frac{3}{2}} \cdot \frac{(V^2_{ca\_RMS} - V^2_{bc\_RMS})}{V_{ab\_RMS} + V_{bc\_RMS} + V_{ca\_RMS}}$$

$$b = \sqrt{\frac{2}{3}} \cdot V_{bc\_RMS} + \sqrt{\frac{3}{2}} \cdot \frac{(V^2_{ab\_RMS} - V^2_{ca\_RMS})}{V_{ab\_RMS} + V_{bc\_RMS} + V_{ca\_RMS}}$$

$$c = \sqrt{\frac{2}{3}} \cdot V_{ca\_RMS} + \sqrt{\frac{3}{2}} \cdot \frac{(V^2_{bc\_RMS} - V^2_{ab\_RMS})}{V_{ab\_RMS} + V_{bc\_RMS} + V_{ca\_RMS}},$$

where a, b and c are the peak amplitudes and where Vab_RMS, Vbc_RMS and Vca_RMS are the first, second and third RMS line-to-line voltages that occur between the first and second, second and third and third and first lines, respectively.

20. The apparatus of claim 17 wherein the processor receives a DC reference voltage and controls the converter to cause the DC voltage across the DC buses to track the reference voltage, the processor further programmed to perform the step of using the reference voltage to identify d and q-axis voltage difference values, the processor performing the step of identifying the second harmonic components by identifying d and q-axis components of the second harmonic, the processor by mathematically combining the difference values and the second harmonic components to identify two phase d and q-axis command voltages.

21. The apparatus of claim 20 wherein the processor is programmed to perform the step of mathematically combining by adding the d and q-axis second harmonic components to the d and q-axis difference values.

22. The apparatus of claim 20 wherein the processor is further programmed to perform the step of using the peak amplitudes to identify a DC offset and wherein the processor is programmed to modify the command voltages by adding the DC offset to the q-axis difference value along with the q-axis second harmonic component.

23. The apparatus of claim 21 wherein the peak amplitudes of the three supply line voltages are a, b and c and wherein the processor performs the step of identifying the d and q axis second harmonic components by using the peak amplitudes to identify a two phase amplitude $A_{min}$ by solving the following equation:

$$A_{min} = A_\alpha \cdot \sin(\phi_\alpha) + A_\beta \cdot \cos(\phi_\beta)/2$$

where:

$$A_\alpha = e^*_0/3 \cdot \sqrt{(a^* + b^*)^2 + (a^* + c^*)^2 + 2(a^*)^2 - b^* \cdot c^*}$$

$$A_\beta = e^*_0/\sqrt{3} \cdot \sqrt{(b^* + c^*)^2 - b^* \cdot c^*}$$

$$\phi_\alpha = \text{arctg}\,[\sqrt{3} \cdot (b^* - c^*)/4a^* + b^* + c^*]$$

$$\phi_\beta = \text{arctg}\,[\sqrt{3} \cdot (b^* - c^*)/b^* - c^*]$$

where:

$e^*_0 = a + b + c/3$; and $a^* = a/e^*_0$; $b^* = b/e^*_0$; $c^* = c/e^*_0$.

24. The apparatus of claim 23 wherein the processor is further programmed to perform the steps of identifying the frequency of the second harmonic of the supply line voltages and using the frequency to identify a two phase supply voltage, the processor performing the step of identifying the second harmonic components including identifying the q-axis second harmonic component by multiplying value $A_{min}$ by the sine of the voltage angle and identifying the d-axis second harmonic component by multiplying value $A_{min}$ by the cosine of the voltage angle.

25. The apparatus of claim 23 wherein the processor performs the step of using the reference voltage to identify d and q-axis voltage difference values using the reference voltage to identifying d and q-axis command currents, obtaining d and q-axis feedback currents, subtracting the d and q-axis feedback currents from the d and q-axis command currents, respectively, and using the d and q-axis command currents to identify the voltage difference values.

26. The apparatus of claim 17 wherein the processor receives a DC reference voltage and controls the converter to cause the DC voltage across the DC buses to track the reference voltage, the processor further programmed to perform the step of using the reference voltage to identify first, second and third phase voltage difference values, the processor performing the step of identifying the second harmonic components by identifying first, second and third phase components of the second harmonic corresponding to the first, second and third supply lines, respectively, the processor programmed to perform the step of modifying the command voltages by mathematically combining the difference values and the second harmonic components to identify first, second and third command voltages.

27. The apparatus of claim 26 wherein the processor is programmed to perform the step of mathematically combining by adding the first, second and third phase second harmonic components to the first, second and third phase difference values.

28. The apparatus of claim 26 wherein the processor is programmed to identifying the peak amplitudes by solving the following equations:

$$a = \sqrt{\frac{2}{3}} \cdot V_{ab\_RMS} + \sqrt{\frac{3}{2}} \cdot \frac{(V_{ca\_RMS}^2 - V_{bc\_RMS}^2)}{V_{ab\_RMS} + V_{bc\_RMS} + V_{ca\_RMS}}$$

$$b = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}}$$

$$c = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{ca\_RMS}},$$

where a, b and c are the peak amplitudes and where Vab_RMS, Vbc_RMS and Vca_RMS are the first, second and third RMS line-to-line voltages that occur between the first and second, second and third and third and first lines, respectively.

29. The apparatus of claim 26 wherein the processor is further programmed to perform the steps of identifying the frequency of the supply line voltages and using the frequency to identify a supply voltage angle, the processor performing the step of identifying the second harmonic components by identifying the q-axis second harmonic component by multiplying peak values a, b and c by the sine of the supply voltage angle, the sine of the supply voltage angle less 120 degrees and the sine of the supply voltage angle plus 120 degrees, respectively.

30. The apparatus of claim 26 wherein the processor is programmed to perform the step of using the reference voltage to identify voltage difference values by using the reference voltage to identifying first, second and third phase reference currents, obtaining first, second and third phase feedback currents, subtracting the first, second and third phase feedback currents from the first, second and third reference currents to identify first, second and third command currents, respectively, and using the first, second and third phase command currents to identify the voltage difference values.

31. A method for use with a controller and a converter wherein the controller receives a reference voltage and generates first, second and third phase control voltages as a function of the reference voltage, the converter receiving the first, second and third phase control voltages and first, second and third phase line voltages and converting the line voltages to a DC voltage across positive and negative DC buses as a function of the control voltages where the line voltages may be unbalanced, the method for substantially reducing the second harmonics in the first, second and third phase line currents caused by drawing current from the lines when the line voltages are unbalanced, the method comprising the steps of:

identifying first, second and third RMS line-to-line voltages;

using the RMS line-to-line voltages to identify peak line voltage values;

mathematically combining the peak line voltage values and at least a derivative of the reference voltage to generate the first, second and third phase command voltages; and using the first, second and third phase command voltages to control the converter.

32. A method for use with first, second and third voltage supply lines that feed a converter, the method for identifying the peak amplitudes of the line voltages, the method comprising the steps of:

obtaining RMS line-to-line voltages from the supply lines; and solving the following equations to identify the peak amplitudes a, b and c of the voltages on the first, second and third supply lines, respectively:

$$a = \sqrt{\frac{2}{3}} \cdot V_{ab\_RMS} + \sqrt{\frac{3}{2}} \cdot \frac{(V_{ca\_RMS}^2 - V_{bc\_RMS}^2)}{V_{ab\_RMS} + V_{bc\_RMS} + V_{ca\_RMS}}$$

$$b = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}}$$

$$c = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{ca\_RMS}}$$

where Vab_RMS, Vbc_RMS and Vca_RMS are the first, second and third RMS line-to-line voltages that occur between the first and second, second and third and third and first lines, respectively.

33. The method of claim 14 also for identifying a second harmonic component that would be generated on the supply lines by the converter during normal operation due to unbalance in the peak amplitudes and using the identified second harmonic component to alter control of a converter linked to the supply lines to convert the AC voltage on the supply lines to a DC bus voltage across positive and negative DC buses.

34. A method for use with a controller and a converter wherein the controller receives a reference voltage and generates first, second and third phase control voltages as a function of the reference voltage, the converter receiving the first, second and third phase control voltages and first, second and third phase line voltages and converting the line voltages to a DC voltage across positive and negative DC buses as a function of the control voltages where the line voltages may be unbalanced, the method for substantially reducing second harmonics in the first, second and third phase line currents caused by drawing current from the lines when the line voltages are unbalanced, the method comprising the steps of:

obtaining first, second and third RMS line-to-line voltages;

identifying the first, second and third peak amplitudes a, b and c, of the first, second and third supply line voltages, respectively, by solving the following equations:

$$a = \sqrt{\frac{2}{3}} \cdot V_{ab\_RMS} + \sqrt{\frac{3}{2}} \cdot \frac{(V_{ca\_RMS}^2 - V_{bc\_RMS}^2)}{V_{ab\_RMS} + V_{bc\_RMS} + V_{ca\_RMS}}$$

$$b = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}}$$

$$c = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{ca\_RMS}},$$

respectively, where Vab_RMS Vbc_RMS and Vca_RMS are the first, second and third RMS line-to-line voltages that occur between the first and second, second and third and third and first lines, respectively;

using the peak amplitudes to identify feed forward voltages;

mathematically combining the feed forward voltages and at least a derivative of the reference voltage to generate the first, second and third phase command voltages; and using the first, second and third phase command voltages to control the converter.

35. A method for use with a controller and a converter where the controller actively controls the converter to convert three phase voltages on three supply lines to a DC voltage across positive and negative DC buses, the method comprising the steps of:
identifying the peak amplitudes a, b and c of the three phase supply line voltages;
identifying a two phase amplitude value $A_{min}$ by solving the following equation:

$$A_{min} = \frac{A_\alpha \cdot \text{Sin}(\varphi_\alpha) + A_\beta \cdot \text{Cos}(\varphi_\beta)}{2}$$

where:

$$A_\alpha = \frac{e_0^*}{3}\sqrt{(a^*+b^*)^2 + (a^*+c^*)^2 + 2(a^*)^2 - b^* \cdot c^*}$$

$$A_\beta = \frac{e_0^*}{\sqrt{3}} \cdot \sqrt{(b^*+c^*)^2 - b^* \cdot c^*}$$

$$\varphi_\alpha = \text{arctg}\left[\frac{\sqrt{3} \cdot (b^* - c^*)}{4a^* + b^* + c^*}\right]$$

$$\varphi_\beta = \text{arctg}\left[\frac{\sqrt{3} \cdot (b^* + c^*)}{b^* - c^*}\right]$$

where:

$$e_0^* = \frac{a+b+c}{3}; \text{ and}$$

$$a^* = \frac{a}{e_0^*}; \quad b^* = \frac{b}{e_0^*}; \quad c^* = \frac{c}{e_0^*}$$

using value Amin to identify d and q-axis second harmonic components that would be generated on the supply lines by the converter during normal operation due to unbalance in the peak amplitudes;
using the d and q-axis second harmonic components to alter control of the converter thereby substantially minimizing the second harmonic components on the three phase supply lines.

36. A method for use with a controller and a converter where the controller actively controls the converter to convert three phase voltages on three supply lines to a DC voltage across positive and negative DC buses, the method comprising the steps of:
identifying unbalance in the peak amplitudes of the three phase supply line voltages; and
using the unbalance to alter control of the converter to substantially eliminate generation of second harmonics on the supply lines due to active converter control.

* * * * *

UNITED STATES PATENT AND TRADEMARK OFFICE
CERTIFICATE OF CORRECTION

PATENT NO. : 7,355,865 B2
APPLICATION NO. : 10/918629
DATED : April 8, 2008
INVENTOR(S) : Semyon Royak It is certified that error appears in the above-identified patent and that said Letters Patent is hereby corrected as shown below:

Column 9, Eq. 33, "$V_\alpha = I_\alpha R \cdot (1 + Tp) + A_\alpha \cdot Sin(\omega t + \phi_\alpha)$" should be -- $V_\alpha = I_\alpha R \cdot (1 + Tp) + A_\alpha \cdot Sin(\omega t + \varphi_\alpha)$ --.

Column 9, Eq. 34, "$V_\beta = I_\beta R \cdot (1 + Tp) + A_\beta \cdot Sin(\omega t + \phi_\beta)$" should be -- $V_\beta = I_\beta R \cdot (1 + Tp) + A_\beta \cdot Sin(\omega t + \varphi_\beta)$ --.

Column 10, Eq. 37,

"$V_d = I_d R \cdot (1 + Tp) + A_\alpha \cdot Sin(\omega t + \phi_\alpha) \cdot Cos(\omega t) - A_\beta \cdot Sin(\omega t + \phi_\beta) \cdot Sin(\omega t)$" should be -- $V_d = I_d R \cdot (1 + Tp) + A_\alpha \cdot Sin(\omega t + \varphi_\alpha) \cdot Cos(\omega t) - A_\beta \cdot Sin(\omega t + \varphi_\beta) \cdot Sin(\omega t)$ --.

Column 10, Eq. 38,

"$V_q = I_q R \cdot (1 + Tp) + A_\alpha \cdot Sin(\omega t + \phi_\alpha) \cdot Sin(\omega t) + A_\beta \cdot Sin(\omega t + \phi_\beta) \cdot Cos(\omega t)$" should be -- $V_q = I_q R \cdot (1 + Tp) + A_\alpha \cdot Sin(\omega t + \varphi_\alpha) \cdot Sin(\omega t) + A_\beta \cdot Sin(\omega t + \varphi_\beta) \cdot Cos(\omega t)$ --.

Column 22, Claim 23, line 8, "$A_{min} = A_\alpha \times Sin(\phi_\alpha) + A_\beta \times Cos(\phi_\beta)/2$" should be -- $A_{min} = \dfrac{A_\alpha \times Sin(\varphi_\alpha) + A_\beta \times Cos(\varphi_\beta)}{2}$ --.

Column 22, Claim 23, line 12, "$A_\alpha = e_0^*/3 \times \sqrt{(a^* + b^*)^2 + (a^* + c^*)^2 + 2(a^*)^2 - b^* \times c^*}$"

should be -- $A_\alpha = \dfrac{e_0^*}{3} \times \sqrt{(a^* + b^*)^2 + (a^* + c^*)^2 + 2(a^*)^2 - b^* \times c^*}$ --.

Column 22, Claim 23, line 14, "$A_\beta = e_0^*/\sqrt{3} \times \sqrt{(b^* + c^*)^2 - b^* \times c^*}$"

UNITED STATES PATENT AND TRADEMARK OFFICE
CERTIFICATE OF CORRECTION

PATENT NO. : 7,355,865 B2  
APPLICATION NO. : 10/918629  
DATED : April 8, 2008  
INVENTOR(S) : Semyon Royak Page 2 of 3

It is certified that error appears in the above-identified patent and that said Letters Patent is hereby corrected as shown below:

should be -- $A_\beta = \dfrac{e_0^*}{\sqrt{3}} \times \sqrt{\left(b^* + c^*\right)^2 - b^* \times c^*}$ --.

Column 22, Claim 23, line 16, " $\phi_\alpha = \text{arctg}\left[\sqrt{3} \times \left(b^* - c^*\right)/4a^* + b^* + c^*\right]$ "

should be -- $\varphi_\alpha = \text{arctg}\left[\dfrac{\sqrt{3} \times \left(b^* - c^*\right)}{4a^* + b^* + c^*}\right]$ --.

Column 22, Claim 23, line 18, " $\phi_\beta = \text{arctg}\left[\sqrt{3} \times \left(b^* + c^*\right)/b^* - c^*\right]$ "

should be -- $\varphi_\beta = \text{arctg}\left[\dfrac{\sqrt{3} \times \left(b^* + c^*\right)}{b^* - c^*}\right]$ --.

Column 22, Claim 23, line 24, " $a^* = a/e_0^*; \quad b^* = b/e_0^*; \quad c^* = c/e_0^*$ "

UNITED STATES PATENT AND TRADEMARK OFFICE
CERTIFICATE OF CORRECTION

PATENT NO. : 7,355,865 B2
APPLICATION NO. : 10/918629
DATED : April 8, 2008
INVENTOR(S) : Semyon Royak It is certified that error appears in the above-identified patent and that said Letters Patent is hereby corrected as shown below:

should be -- $a^* = \dfrac{a}{e_0^*}; \; b^* = \dfrac{b}{e_0^*}; \; c^* = \dfrac{c}{e_0^*}$ --.

Signed and Sealed this

Fifteenth Day of July, 2008

JON W. DUDAS
*Director of the United States Patent and Trademark Office*